United States Patent
Zhao et al.

(10) Patent No.: US 11,635,359 B2
(45) Date of Patent: Apr. 25, 2023

(54) INSTRUMENT AND METHOD FOR MECHANICAL PROPERTIES IN SITU TESTING OF MATERIALS UNDER HIGH TEMPERATURE AND COMPLEX MECHANICAL LOADS

(71) Applicant: Jilin University, Jilin (CN)

(72) Inventors: Hongwei Zhao, Jilin (CN); Jiucheng Zhao, Jilin (CN); Shizhong Zhang, Jilin (CN); Lixia Xu, Jilin (CN); Jie Wan, Jilin (CN); Xu Jing, Jilin (CN); Daqing Zhao, Jilin (CN); Zhenzhang Zhao, Jilin (CN); Liming Zhou, Jilin (CN); Yuming Fang, Jilin (CN); Yu An Mou, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 0 days.

(21) Appl. No.: 17/642,517

(22) PCT Filed: Feb. 17, 2020

(86) PCT No.: PCT/CN2020/075471
§ 371 (c)(1),
(2) Date: Mar. 11, 2022

(87) PCT Pub. No.: WO2021/047145
PCT Pub. Date: Mar. 18, 2021

(65) Prior Publication Data
US 2022/0341829 A1   Oct. 27, 2022

(30) Foreign Application Priority Data
Sep. 12, 2019  (CN) .......................... 201910861743.0

(51) Int. Cl.
*G01N 3/18* (2006.01)
*G01N 3/20* (2006.01)
*G01N 3/12* (2006.01)

(52) U.S. Cl.
CPC ................. *G01N 3/20* (2013.01); *G01N 3/12* (2013.01); *G01N 3/18* (2013.01);
(Continued)

(58) Field of Classification Search
CPC .......... G01N 25/72; G01N 3/38; G01N 3/068; G01N 17/02; G01N 17/002; G01N 3/40;
(Continued)

(56) References Cited

U.S. PATENT DOCUMENTS 5,613,776 A * 3/1997 Turner ................ G01M 99/002
   374/57
6,023,980 A * 2/2000 Owen ...................... G01N 3/38
   73/797

(Continued)

FOREIGN PATENT DOCUMENTS

| CN | 101819114 A | 9/2010 |
| CN | 203337493 U | 12/2013 |

(Continued)

OTHER PUBLICATIONS

International Search Report dated Jun. 17, 2020 issued in PCT/CN2020/075471.
(Continued)

*Primary Examiner* — Brandi N Hopkins
(74) *Attorney, Agent, or Firm* — Scully, Scott, Murphy & Presser, P.C.

(57) ABSTRACT

An instrument and method for mechanical properties in situ testing of materials under a high temperature and complex mechanical loads are provided. The instrument includes: a support frame module used to provide a stable support and
(Continued)

an effective vibration isolation for each functional module of the instrument; a high-frequency fatigue load applying module used to apply a high-frequency fatigue load on a tested sample; a static-dynamic mechanical load applying module used to apply a combination of static-dynamic tension/compression/bending loads on the tested sample; a high/low temperature applying module used to apply a variable temperature environment from a low temperature to a high temperature on the tested sample; and an in-situ monitoring module that may integrate a surface deformation damage measurement assembly, a three-dimensional strain measurement assembly, a microstructure measurement assembly, and an internal damage detection assembly according to a practical testing requirement.

9 Claims, 21 Drawing Sheets

(52) U.S. Cl.
CPC .............. *G01N 2203/0017* (2013.01); *G01N 2203/0019* (2013.01); *G01N 2203/0023* (2013.01); *G01N 2203/0048* (2013.01); *G01N 2203/0055* (2013.01); *G01N 2203/0073* (2013.01); *G01N 2203/0075* (2013.01); *G01N 2203/0226* (2013.01); *G01N 2203/0228* (2013.01); *G01N 2203/0244* (2013.01); *G01N 2203/0676* (2013.01)

(58) Field of Classification Search
CPC ............ G01N 3/16; G01N 21/17; G01N 3/24; G01N 3/317; G01N 1/42; G01N 29/2431; G01N 27/021; G01N 3/10; G01N 3/00; G01N 3/18; G01N 3/02; G01N 3/36; G01N 3/06; G01N 21/65; G01N 21/3586; G01N 3/54; G01N 3/32; G01N 27/9013; G01N 29/14; G01N 3/08; G01M 7/022; G01M 5/0008; G01L 25/00; B81C 99/004; G06F 30/23

See application file for complete search history.

(56) References Cited

U.S. PATENT DOCUMENTS

| | | |
|---|---|---|
| 2008/0312848 A1 | 12/2008 | Fogarty et al. |
| 2012/0084019 A1 | 4/2012 | Khonsari |
| 2016/0187244 A1* | 6/2016 | Seok .................... G01N 3/60 73/863.11 |

FOREIGN PATENT DOCUMENTS

| | | |
|---|---|---|
| CN | 103512803 A | 1/2014 |
| CN | 203643276 U | 6/2014 |
| CN | 105628487 A | 6/2016 |
| CN | 107941624 A | 4/2018 |
| CN | 108562505 A | 9/2018 |
| CN | 208297270 U | 12/2018 |
| CN | 109883833 A | 6/2019 |
| CN | 110579404 A | 12/2019 |
| JP | H9-138190 A | 5/1997 |

OTHER PUBLICATIONS

Written Opinion dated Jun. 17, 2020 issued in PCT/CN2020/075471.
First Office Action issued in CN 201910861743.0.
Notice of Allowance dated Aug. 19, 20201 issued in CN 201910861743.0.

* cited by examiner

INSTRUMENT AND METHOD FOR MECHANICAL PROPERTIES IN SITU TESTING OF MATERIALS UNDER HIGH TEMPERATURE AND COMPLEX MECHANICAL LOADS

CROSS-REFERENCE TO RELATED APPLICATION

This application is a Section 371 National Stage Application of International Application No. PCT/CN2020/075471, filed on Feb. 17, 2020, which claims priority to Chinese Patent Application No. 201910861743.0, filed on Sep. 12, 2019, incorporated herein by reference in their entirety.

TECHNICAL FIELD

The present disclosure relates to a field of a precise scientific instrument, in particular to an instrument and method for mechanical properties in situ testing of materials under a high temperature and complex mechanical loads.

BACKGROUND

With a continuous development of science and technology, in a plurality of key fields such as aerospace, automobile manufacturing and nuclear industry, requirements for a guarantee capability of mechanical properties of materials under the action of a high temperature, a heavy load, and a high-frequency load have been significantly increased. Advanced mechanical testing instruments and mechanical testing technology have become a key to testing material properties and optimizing processes. Facing the material testing requirements in the plurality of key fields, conducting a test for mechanical properties of materials under a high temperature and complex mechanical loads in situ is a guarantee for evaluating the mechanical properties and a service safety of the materials under service conditions.

In response to the above-mentioned significant needs, research and development of relevant testing technologies and testing instruments has been carried out at home and abroad. For a construction of a high-temperature environment, scholars from Germany and the United States have successively studied atmosphere heating methods such as air and inert gas atmosphere heating methods, irradiation heating technology and environmental chamber heating technology, and some foreign companies have launched high-temperature applying instruments. For fatigue testing, relevant scholars from Japan, the United States and China have proposed high-temperature fatigue testing technology and mechanical-thermal coupled high-frequency fatigue testing technology, and high-temperature fatigue testing instruments have been developed at home and abroad. For combined loads applying test, Europe, Japan and Portugal have successively proposed fatigue testing technology under tensile preload, fatigue failure testing technology for nickel-based alloys under tension-torsion and force-thermal coupling, and tension-bending multi-axial fatigue testing technology, and relevant test instruments have been developed. For testing in situ, Lawrence Berkeley National Laboratory in the United States, Massachusetts Institute of Technology, University of Cambridge, Ecole Polytechnique Federale de Lausanne, Zhejiang University, and Jilin University, etc., have successively developed in-situ testing technologies such as indentation, stretching and bending under in-situ monitoring such as scanning electron microscopy and digital speckle, and related companies in the United States, the United Kingdom, and China have successively launched commercial in-situ testing instruments.

The above-mentioned testing instruments and testing technologies have respective characteristics and play an important role in testing mechanical properties of materials. But so far, there are few reports on instruments and technologies for testing mechanical properties of materials under a high temperature and complex mechanical loads in situ. The existing testing instruments and testing technologies are difficult to meet the testing requirements for materials in various key fields such as aerospace, automobile manufacturing, and nuclear industry, which restricts a guarantee of material properties and a strict quality control. Therefore, in response to major national needs, it is very important to develop an instrument for mechanical properties in situ testing of materials under a high temperature and complex mechanical loads, and to propose a method for mechanical properties in situ testing of materials under a high temperature and complex mechanical loads.

SUMMARY

An objective of the present disclosure is to provide an instrument and method for mechanical properties in situ testing of materials under a high temperature and complex mechanical loads, to make up for deficiencies of the existing testing instruments and methods. The present disclosure may be implemented to apply a high-precision high/low-temperature environment with a vacuum or an inert gas atmosphere and a combination of series-parallel hybrid static-dynamic mechanical loads with a multi-stage mechanical transmission, based on electro-hydraulic servo driving technology, piezoelectric ultrasonic driving technology, uniformly distributed resistance wire radiation heating technology under vacuum/inert gas atmosphere and non-contact refrigeration technology of circulating cold medium, and the present disclosure may integrate a surface deformation damage measurement assembly, a three-dimensional strain measurement assembly, a microstructure measurement assembly, and an internal damage detection assembly, so as to precisely measure a micromechanical behavior in situ, a deformation damage mode, and a property evolution law of a tested sample at the same time. Combined with the instrument for mechanical properties in situ testing of materials under a high temperature and complex mechanical loads, a method for mechanical properties in situ testing of materials under a high temperature and complex mechanical loads is provided, which provides an innovative technical means to solve the scientific problems of material mechanical behavior, deformation damage mechanism and its correlation with a complex load and material properties that are close to an actual operation condition under the action of a high temperature and a complex static-dynamic mechanical load, in response to the significant national needs.

The above-described objective of the present disclosure may be achieved by the following technical solutions.

An instrument for mechanical properties in situ testing of materials under a high temperature and complex mechanical loads is provided, including a support frame module 1, a high-frequency fatigue load applying module 2, a static-dynamic mechanical load applying module 3, a high/low temperature applying module 4, and an in-situ monitoring module 5, where the support frame module 1 is isolated from a vibration through a vibration isolation spring 10503 and is fixed to the ground through an anchor screw 10504; the high-frequency fatigue load applying module 2 is rigidly connected to a support plate 102 in the support frame module 1 through a motor support base 222, matched with a rail assembly I 104 of the support frame module 1 through a slider assembly I 219, and rigidly connected to welded bellows I 40101 of a high-temperature applying sub-module 401 through a connecting flange 214, and is configured to apply a high-frequency fatigue load on a tested sample 30108 or apply a static bending preload on the tested sample 30108; the static-dynamic mechanical load applying module 3 is rigidly connected to a mounting platform 105 of the support frame module 1 through a hydraulic cylinder fixing plate 30202 and an intermediate connecting plate 30303, and is connected to welded bellows II 40108, welded bellows IV 40115, and welded bellows III 40114 of the high-temperature applying sub-module 401 respectively through a flange of a high-temperature connecting rod I, a flange of a high-temperature connecting rod II, and a flange of a high-temperature connecting rod III, and is configured to apply a combination of static-dynamic tension/compression/bending loads on the tested sample 30108; the high-temperature applying sub-module 401 of the high/low temperature applying module 4 is rigidly connected to the mounting platform 105 through an L-shaped rail base 40105, a low-temperature applying sub-module 402 of the high/low temperature applying module 4 is matched with a rail assembly III 40305 of a rotary cart 403 through a slider assembly III 40209, and the high-temperature applying sub-module 401 and the low-temperature applying sub-module 402 are switchable for use, so as to apply a variable temperature environment from a low temperature to a high temperature on the tested sample 30108; and the in-situ monitoring module 5 is arranged in front of and behind the high-temperature applying sub-module 401 and is integrally fixed on the mounting platform 105, and is configured to perform dynamic in-situ monitoring of a microstructure evolution of the tested sample 30108 and a fatigue failure mode of the tested sample 30108.

The support frame module 1 as a whole has a four-pillar structure to firmly support the high-frequency fatigue load applying module 2, the static-dynamic mechanical load applying module 3, the high/low temperature applying module 4, and the in-situ monitoring module 5; the support frame module 1 has such a structure that an upper surface of a mounting table 10502 is machined with mutually perpendicular T-shaped grooves, a lower surface of the mounting table 10502 is machined with mutually perpendicular reinforcing ribs, and a middle of the mounting table 10502 is machined with grooves for mounting and positioning a static-dynamic bending load applying sub-module 303.

The high-frequency fatigue load applying module 2 is vertically arranged above the instrument and is rigidly connected to the support plate 102 of the support frame module 1 through the motor support base 222, so as to mount and position the high-frequency fatigue load applying module 2; the high-frequency fatigue load applying module 2 is matched with the rail assembly 1104 of the support frame module 1 through the slider assembly I 219, so that a precise guidance of the high-frequency fatigue load applying module 2 in a load applying direction is achieved and a lateral force influence generated during a test process is eliminated; the high-frequency fatigue load applying module 2 is rigidly connected to the welding bellows I 40101 of the high-temperature applying sub-module 401 through the connecting flange 214, so that the high-frequency fatigue load applying module 2 is sealed with the high-temperature applying sub-module 401; the high-frequency fatigue load applying module 2 is driven by a servo motor 201, and a power is finally transmitted to an ultrasonic bending indenter 212 after a transmission by a reducer 223, a coupling 202 and a lead screw 221, so as to apply a static bending preload on the tested sample 30108; the high-frequency fatigue load applying module 2 is driven by an ultrasonic transducer 208, and an amplitude is amplified step by step through an ultrasonic connector I 210, an ultrasonic connector II 211, and an ultrasonic probe 213, and is finally transmitted to the ultrasonic bending indenter 212, so as to apply a high-frequency fatigue load on the tested sample 30108.

The static-dynamic mechanical load applying module 3 is arranged on the mounting platform 105, and includes a high-temperature connecting rod assembly 301, a static-dynamic tension/compression load applying sub-module 302, and a static-dynamic bending load applying sub-module 303, where the high-temperature connecting rod assembly 301 enables a normal use of the static-dynamic mechanical load applying module 3 in a high-temperature environment; the static-dynamic tension/compression load applying sub-module 302 is arranged horizontally, a hydraulic cylinder assembly I 30201 and a hydraulic cylinder assembly II 30205 have a same structure and are symmetrically arranged with respect to the tested sample 30108; the hydraulic cylinder assembly I 30201 and the hydraulic cylinder assembly II 30205 are individually operable to apply a static-dynamic tension/compression load on a single end of the tested sample 30108 during a test, and are synchronously operable to apply static-dynamic tension/compression loads synchronously on both ends of the tested sample 30108, so as to prevent a center of a gauge length section of the tested sample 30108 from shifting during a process of applying the loads; the static-dynamic bending load applying sub-module 303 is vertically arranged below the instrument and is rigidly connected to a lower surface of the mounting platform 105 through the intermediate connecting plate 30303, where the static-dynamic bending load applying sub-module 303 is individually operable to perform a static-dynamic bending load on the tested sample 30108, or operable in cooperation with the hydraulic cylinder assembly I 30201 and the hydraulic cylinder assembly II 30205 of the static-dynamic tension/compression load applying sub-module 302 to apply composite static-dynamic tension/compression-bending loads synchronously on both ends of the tested sample 30108, so as to prevent the center of the gauge length section of the tested sample 30108 from shifting during a process of applying the composite loads.

The high/low temperature applying module 4 includes the high-temperature applying sub-module 401, the low-temperature applying sub-module 402, and the rotary cart 403; the high-temperature applying sub-module 401 is rigidly connected to the mounting platform 105 of the support frame module 1 through the L-shaped rail base 40105, and the low-temperature applying sub-module 402 is matched with the rail assembly III 40305 of the rotary cart 403 through the slider assembly III 40209; the rotary cart 403 is movable through four rollers 40302, and a height of the rail assembly III (40305) and a level of the rail assembly III 40305 are adjustable through four adjustment screws 40303; the high-temperature applying sub-module 401 and the low-temperature applying sub-module 402 are switchable for use through the rotary cart 403.

The in-situ monitoring module 5 includes a three-degree-of-freedom motion platform 501, a surface deformation damage measurement assembly 502, a microstructure measurement assembly 503, an internal damage detection assembly 504, and a three-dimensional strain measurement assembly 505, where the internal damage detection assembly 504 and the three-dimensional strain measurement assembly 505 are arranged in front of the high-temperature applying sub-module 401 to dynamically monitor global temperature information, internal damage information, and three-dimensional strain information of the gauge length section of the tested sample 30108 respectively; the surface deformation damage measurement assembly 502 and the microstructure measurement assembly 503 are arranged on the three-degree-of-freedom motion platform 501 behind the high-temperature applying sub-module 401, and the three-degree-of-freedom motion platform 501 is rigidly connected to the mounting platform 105 through a screw, where through the three-degree-of-freedom motion platform 501, the surface deformation damage measurement assembly 502 and the microstructure measurement assembly 503 are switchable for use, and relative positions of the surface deformation damage measurement assembly 502 and the microstructure measurement assembly 503 are precisely adjusted along an axial direction of the tested sample 30108 and a radial direction of the tested sample 30108, so as to monitor global surface deformation damage information of the gauge length section of the tested sample 30108 in real time, and performing a follow-up monitoring of micro-area morphology of the gauge length section of the tested sample 30108; four in-situ monitoring measures including the surface deformation damage measurement assembly 502, the microstructure measurement assembly 503, the internal damage detection assembly 504, and the three-dimensional strain measurement assembly 505 are individually operable, operable in a pairwise combination, or operable in a combination of at most three at a same time, so as to dynamically monitor the microstructure evolution of the tested sample 30108 and the fatigue failure mode of the tested sample 30108 in situ.

The high-frequency fatigue load applying module 2 is arranged vertically, the static-dynamic tension/compression load applying sub-module 302 is arranged horizontally, and the high-frequency fatigue load applying module 2 and the static-dynamic tension/compression load applying sub-module 302 are perpendicular to each other in space; the high-frequency fatigue load applying module 2 is individually operable, to apply a static bending preload and a high-frequency fatigue load on the tested sample 30108 during a test; and the high-frequency fatigue load applying module 2 is operable in cooperation with the static-dynamic tension/compression load applying sub-module 302 to apply a high-frequency fatigue load on the tested sample 30108 loaded with a static-dynamic bending load applied.

The hydraulic cylinder fixing plate 30202 is rigidly connected to the mounting platform 105 through a T-bolt and is rigidly connected to four pull rods 30203 through an expansion sleeve assembly 30204 to form a reinforced force closed-loop structure, so as to greatly increase a rigidity of the static-dynamic tension/compression load applying sub-module 302; and the hydraulic cylinder assembly I 30201 and the hydraulic cylinder assembly II 30205 are movable toward each other along the pull rods 30203 to precisely adjust relative positions of the hydraulic cylinder assembly I 30201 and the hydraulic cylinder assembly II 30205.

An upper side, a lower side, a left side, and a right side of a chamber of a vacuum chamber I 40112 of the high-temperature applying sub-module 401 are respectively mounted with the welded bellows I 40101, the welded bellows III 40114, the welded bellows II 40108, and the welded bellows IV 40115, and are respectively connected to the connecting flange 214, the flange on the high-temperature connecting rod I 30101, the flange on the high-temperature connecting rod II 30106, and the flange of the high-temperature connecting rod III 30306, so that the vacuum chamber I 40112 moves in a sealed state during a test; a front side and a rear side of the chamber of the vacuum chamber I 40112 are respectively provided with a quartz observation window I 40118 and a quartz observation window II 40113, so that the in-situ monitoring module 5 dynamically monitors the tested sample 30108 in situ smoothly.

Another objective of the present disclosure is to provide a method for mechanical properties in situ testing of materials under a high temperature and complex mechanical loads, including the following steps:

step 1 of installing a tested sample 30108, where a thread at a clamped end of the tested sample 30108 is matched with an internal thread of a connector I (30102) and an internal thread of a connector II 30107, the connector I 30102 and the connector II 30107 are respectively mounted in a mounting hole at an end of the high-temperature connecting rod I 30101 and a mounting hole at an end of the high-temperature connecting rod II 30106, and a high-temperature connector I 30103 and a high-temperature connector II 30104 are tightened, so as to install the tested sample 30108;

step 2 of applying, by a high temperature applying sub-module 401, a high-temperature environment on the tested sample 30108, where a vacuum chamber I 40112 is evacuated by a mechanical pump, or an inert gas is continuously introduced into the vacuum chamber I 40112 to form an inert gas atmosphere; a temperature controller applies voltages of different values to three sections of resistance wire in a heating furnace 40104 to heat the heating furnace 40104, and a high-temperature environment of different temperatures is applied on the tested sample 30108 by means of thermal radiation; an infrared colorimeter I 40119 and an infrared colorimeter II 40120 monitor a temperature of a gauge length section of the tested sample 30108 in real time, and an average value of the temperature is determined and fed back to the temperature controller, so as to form a closed-loop control;

step 3 of applying, by a static-dynamic tension/compression load applying sub-module 302, static tension/compression loads synchronously on both ends of the tested sample 30108, where a motion controller controls a high-pressure hydraulic oil to drive a piston rod I 3020103 of a hydraulic cylinder assembly I 30201 and a piston rod I 3020103 of a hydraulic cylinder assembly II 30205 to move synchronously toward each other, then hydraulic forced clamps 302018 are driven to move synchronously toward each other through a transmission by an intermediate connecting assembly, and finally both ends of the high-temperature connecting rod assembly 301 are driven to move synchronously toward each other, so as to apply the static tension/compression loads synchronously on both ends of the tested sample 30108;

step 4 of applying, by a high-frequency fatigue load applying module 2, a static bending load on the tested sample 30108, where a power output by a servo motor 201 is finally transmitted to an ultrasonic bending indenter 212 after being multi-stage decelerated by a reducer 223, converted by a lead screw 221 and a lead screw nut 204, and transmitted by a connecting sleeve 220, a connecting plate 205, a tension/compression sensor I 206, a mounting plate 207, a dowel rod 217, an upper clamping plate 216, a lower clamping plate 215, an ultrasonic connector I 210, an ultrasonic connector II 211, and an ultrasonic probe 213, so as to apply a static bending preload on the tested sample 30108;

step 5 of applying, by a high-frequency fatigue load applying module 2, an ultrasonic fatigue load on the tested sample 30108, where a weak amplitude output by an ultrasonic transducer 208 is finally transmitted to the ultrasonic bending indenter (212) after being amplified step by step by an ultrasonic connector I 210, an ultrasonic connector II 211, and an ultrasonic probe 213, to apply a high-frequency fatigue load on the tested sample 30108; and step 6 of dynamically monitoring, by an in-situ monitoring module 5, the tested sample 30108 in situ, where an internal damage detection assembly 504 and a three-dimensional strain measurement assembly 505 dynamically monitor global temperature information, internal damage information, and three-dimensional strain information of the gauge length section of the tested sample 30108; the surface deformation damage measurement assembly 502 and the microstructure measurement assembly 503 are switchable for use through the three-degree-of-freedom motion platform (501), and relative positions of the surface deformation damage measurement assembly 502 and the microstructure measurement assembly 503 along an axial direction of the tested sample 30108 and a radial direction of the tested sample 30108 are precisely adjusted through the three-degree-of-freedom motion platform 501, so as to monitor global surface deformation damage information of the gauge length section of the tested sample 30108 in real time, and performing a follow-up monitoring of a micro-area morphology of the gauge length section of the tested sample 30108, where four in-situ monitoring measures including the surface deformation damage measurement assembly 502, the microstructure measurement assembly 503, the internal damage detection assembly 504, and the three-dimensional strain measurement assembly 505 are individually operable, operable in a pairwise combination, or operable in a combination of at most three at a same time, so as to dynamically monitor microstructure evolution of the tested sample 30108 and a fatigue failure mode of the tested sample 30108 in situ.

The present disclosure may have the following beneficial effects.

First, a modular design idea is adopted. The instrument includes the support frame module, the high-frequency fatigue load applying module, the static-dynamic mechanical load applying module, the high/low temperature applying module, the in-situ monitoring module, etc. The static-dynamic mechanical load applying module mainly includes the static-dynamic tension/compression load applying sub-module and the static-dynamic bending load applying sub-module. The high/low temperature applying module mainly includes the high-temperature applying sub-module and the low-temperature applying sub-module. The in-situ monitoring module mainly includes the surface deformation damage measurement assembly, the microstructure measurement assembly, the internal damage detection assembly, and the three-dimensional strain measurement assembly. The whole instrument is highly modularized and standardized, which is convenient for maintenance.

Second, a vacuum or an inert gas atmosphere may be formed. Each of the high-temperature applying sub-module and the low-temperature applying sub-module of the instrument is provided with a vacuum chamber. An inert gas may be continuously introduced into the vacuum chamber to exhaust air (oxygen), or a mechanical pump (external device) may be used to extract the air (oxygen) in the vacuum chamber, so as to form an inert gas atmosphere or a vacuum-tight environment, which may effectively prevent a surface of the tested sample from being oxidized.

Third, the temperature environment applied has a relatively wide range. The instrument integrates the high-temperature applying sub-module and the low-temperature applying sub-module that may be switchable for use, so that a high/low temperature from −55° C. to 1200° C. may be applied on the tested sample with high precision and wide range.

Fourth, an actual service condition of materials may be simulated. The instrument integrates the high-frequency fatigue load applying module, the static-dynamic mechanical load applying module, and the high/low temperature applying module. A high-temperature environment may be formed, and a high-frequency fatigue load may be performed on the tested sample with a static-dynamic bending load applied, which may realistically simulate the actual service conditions for materials in a plurality of key fields such as the field of aerospace, the field of automobile manufacturing, and the field of nuclear industry.

Fifth, the test function is rich. The instrument adopts electro-hydraulic servo driving technology, piezoelectric ultrasonic driving technology, uniformly distributed resistance wire radiation heating technology under vacuum/inert gas atmosphere, and non-contact refrigeration technology of circulating cold medium, and the instrument integrates the surface deformation damage measurement assembly, the three-dimensional strain measurement assembly, the microstructure measurement assembly, and the internal damage detection assembly, so as to apply a high/low-temperature environment under a vacuum or an inert gas atmosphere with high precision, apply composite series-parallel hybrid static-dynamic mechanical loads with a multi-stage mechanical transmission, and dynamically monitor the test process in situ. The instrument has various load forms, and the various loads may be combined with each other, so that the test function is very rich.

Sixth, a parallel in-situ monitoring may be achieved. The instrument integrates the surface deformation damage measurement assembly, the three-dimensional strain measurement assembly, the microstructure measurement assembly, and the internal damage detection assembly. These four in-situ monitoring measures may be used individually, in a pairwise combination, or in a combination of at most three, to dynamically monitor the microstructure evolution of the tested sample and the fatigue failure mode of the tested sample in situ.

BRIEF DESCRIPTION OF THE DRAWINGS

The accompanying drawings described herein are used to provide a further understanding of the present disclosure and constitute part of this application. The schematic examples of the present disclosure and their descriptions are used to explain the present disclosure and do not constitute an improper limitation of the present disclosure.

Figure 1:
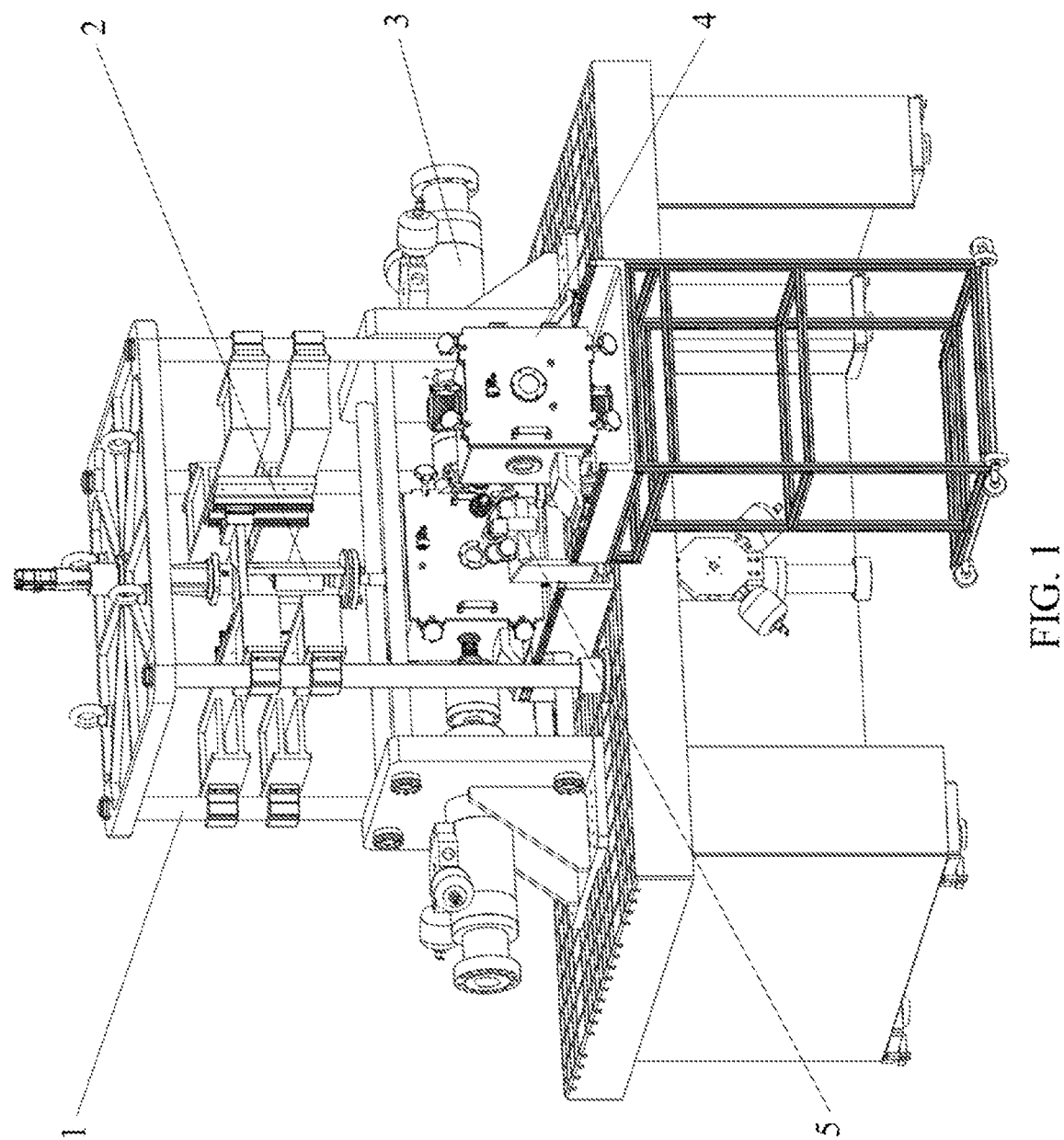
FIG. 1 shows a schematic diagram of a structure of an overall appearance of the present disclosure.

Description of reference numerals: 1, overall frame module; 2, high-frequency fatigue load applying module; 3, static-dynamic mechanical load applying module; 4, high/low temperature applying module; 5, in-situ monitoring module; 101, eyebolt; 102, support plate; 103, rail base I; 104, rail assembly I; 105, mounting platform; 106, fixing sleeve; 107, pillar; 108, mounting frame; 109, connecting block; 110, locking nut; 10501, baffle; 10502, mounting table; 10503, vibration isolation spring; 10504, anchor screw; 201, servo motor; 202, coupling; 203, lead screw support unit; 204, lead screw nut; 205, connecting plate; 206, tension/compression sensor I; 207, mounting plate; 208, ultrasonic transducer; 209, bolt; 210, ultrasonic connector I; 211, ultrasonic connector II; 212, ultrasonic bending indenter; 213, ultrasonic probe; 214, connecting flange; 215, lower clamping plate; 216, upper clamping plate; 217, dowel rod; 218, slider support base; 219, slider assembly I; 220, connecting sleeve; 221, lead screw; 222, motor support base; 223, reducer; 301, high-temperature connecting rod assembly; 302, static-dynamic tension/compression load applying sub-module; 303, static-dynamic bending load applying sub-module; 30101, high-temperature connecting rod I; 30102, connector I; 30103, high-temperature connector I; 30104, high-temperature connector II; 30105, high temperature pad II; 30106, high-temperature connecting rod II; 30107, connector II; 30108, tested sample; 30109, high temperature pad I; 30201, hydraulic cylinder assembly I; 30202, hydraulic cylinder fixing plate; 30203, pull rod; 30204, expansion sleeve assembly; 30205, hydraulic cylinder assembly II; 3020101, accumulator assembly I; 3020102, valve plate assembly I; 3020103, piston rod I; 3020104, nut II; 3020105, nut III; 3020106, tension/compression sensor II; 3020107, nut V; 3020108, hydraulic forced clamp; 3020109, nut VI; 3020110, double-ended stud; 3020111, nut IV; 3020112, intermediate connecting rod I; 3020113, nut I; 3020114, hydraulic cylinder flange I; 3020115, hydraulic cylinder I; 30301, accumulator assembly II; 30302, hydraulic cylinder flange II; 30303, intermediate connecting plate; 30304, intermediate connecting rod II; 30305, tension/compression sensor III; 30306, high-temperature connecting rod III; 30307, bending indenter; 30308, nut IX; 30309, nut VIII; 30310, nut VII; 30311, piston rod II; 30312, valve plate assembly II; 30313, hydraulic cylinder II; 401, high-temperature applying sub-module; 402, low-temperature applying sub-module; 403, rotary cart; 40101, welded bellows I; 40102, vacuum pressure gauge; 40103, furnace body support frame; 40104, heating furnace; 40105, L-shaped rail base; 40106, slider assembly II; 40107, chamber support frame I; 40108, welded bellows II; 40109, chamber door locker I; 40110, vacuum chamber door I; 40111, hinge I; 40112, vacuum chamber I; 40113, quartz observation window II; 40114, welded bellows III; 40115, welded bellows IV; 40116, rail assembly II; 40117, chamber door handle I; 40118, quartz observation window I; 40119, infrared colorimeter I; 40120, infrared colorimeter II; 40201, welded bellows V; 40202, chamber door locker II; 40203, vacuum chamber door II; 40204, chamber door handle II; 40205, hinge II; 40206, refrigeration chamber support base; 40207, refrigeration chamber; 40208, welded bellows VI; 40209, slider assembly III; 40210, chamber support frame II; 40211, quartz observation window III; 40212, vacuum chamber II; 40213, gas spring assembly; 40214, vacuum bellows assembly; 40301, rail base II; 40302, roller; 40303, adjustment screw; 40304, support frame; 40305, rail assembly III; 501, three-degree-of-freedom motion platform; 502, surface deformation damage measurement assembly; 503, microstructure measurement assembly; 504, internal damage detection assembly; 505, three-dimensional strain measurement assembly.

DETAILED DESCRIPTION OF EMBODIMENTS

The details of the present disclosure and the specific embodiments thereof will be further described below with reference to the accompanying drawings.

Referring to FIG. 1 to FIG. 24, the present disclosure provides an instrument and method for mechanical properties in situ testing of materials under a high temperature and complex mechanical loads. The instrument includes a support frame, a high-frequency fatigue load applying module, a static-dynamic mechanical load applying module, a high/low temperature applying module, an in-situ monitoring module, etc. The support frame module is used to provide a stable support and effective vibration isolation for each functional module of the instrument. The high-frequency fatigue load applying module is used to apply a high-frequency fatigue load on the tested sample, and a static bending preload may be further applied according to an actual test requirement. The static-dynamic mechanical load applying module is used to apply a combination of static-dynamic tension/compression/bending loads on the tested sample. The high/low temperature applying module is used to apply a variable temperature environment from a low temperature to a high temperature on the tested sample. The in-situ monitoring module may integrate a surface deformation damage measurement assembly, a three-dimensional strain measurement assembly, a microstructure measurement assembly, and an internal damage detection assembly according to the actual test requirement, so as to precisely measure a micromechanical behavior, a deformation damage mode, and a performance evolution law of the tested sample in situ at the same time. The present disclosure may meet significant national needs, and provide a new technology and new method for testing and analyzing the mechanical properties of materials under a complex and harsh operation condition, which has advantages of a complex environment of loads, a rich test content and a high measurement accuracy, and provides an innovative technical means for testing and analyzing mechanical properties of materials under a high temperature and a complex static-dynamic mechanical load.

The instrument for mechanical properties in situ testing of materials under a high temperature and complex mechanical loads of the present disclosure includes a support frame module 1, a high-frequency fatigue load applying module 2, a static-dynamic mechanical load applying module 3, a high/low temperature applying module 4, and an in-situ monitoring module 5. The support frame module 1 isolates a vibration through a vibration isolation spring 10503, and is fixed to the ground through an anchor screw 10504. The support frame module 1 is used to firmly support other functional modules and provide a good vibration isolation treatment and a precise installation and positioning. The high-frequency fatigue load applying module 2 is rigidly connected to a support plate 102 in the support frame module 1 through a motor support base 222, matched with a rail assembly I 104 of the support frame module 1 through a slider assembly I 219, and connected to welded bellows I 40101 of a high-temperature applying sub-module 401 through a connecting flange 214. The high-frequency fatigue load applying module 2 is used to apply a high-frequency fatigue load on a tested sample 30108, or may apply a static bending preload according to an actual test requirement. The static-dynamic mechanical load applying module 3 is rigidly connected to a mounting platform 105 of the support frame module 1 through a hydraulic cylinder fixing plate 30202 and an intermediate connecting plate 30303, and the static-dynamic mechanical load applying module 3 is rigidly connected to welded bellows II 40108, welded bellows IV 40115, and welded bellows III 40114 of the high-temperature applying sub-module 401 through a flange of a high-temperature connecting rod I, a flange of a high-temperature connecting rod II, and a flange of a high-temperature connecting rod III respectively, so as to apply a combination of static-dynamic tension/compression/bending loads on the tested sample 30108. The high-temperature applying sub-module 401 of the high/low temperature applying module 4 is rigidly connected to the mounting platform 105 of the support frame module 1 through an L-shaped rail base 40105, and a low-temperature applying sub-module 402 of the high/low temperature applying module 4 is matched with a rail assembly III 40305 of a rotary cart 403 through a slider assembly III 40209. The high-temperature applying sub-module 401 and the low-temperature applying sub-module 402 are switchable for use, so as to apply a variable environment from a low temperature to a high temperature on the tested sample 30108. The in-situ monitoring module 5 is arranged in front of the high-temperature applying sub-module 401 and behind the high-temperature applying sub-module 401, and is integrally fixed to the mounting platform 105 of the support frame module 1. The in-situ monitoring module 5 is used to dynamically monitor microstructure evolution of the tested sample 30108 and a fatigue failure mode of the tested sample 30108 in situ.

Figure 2:
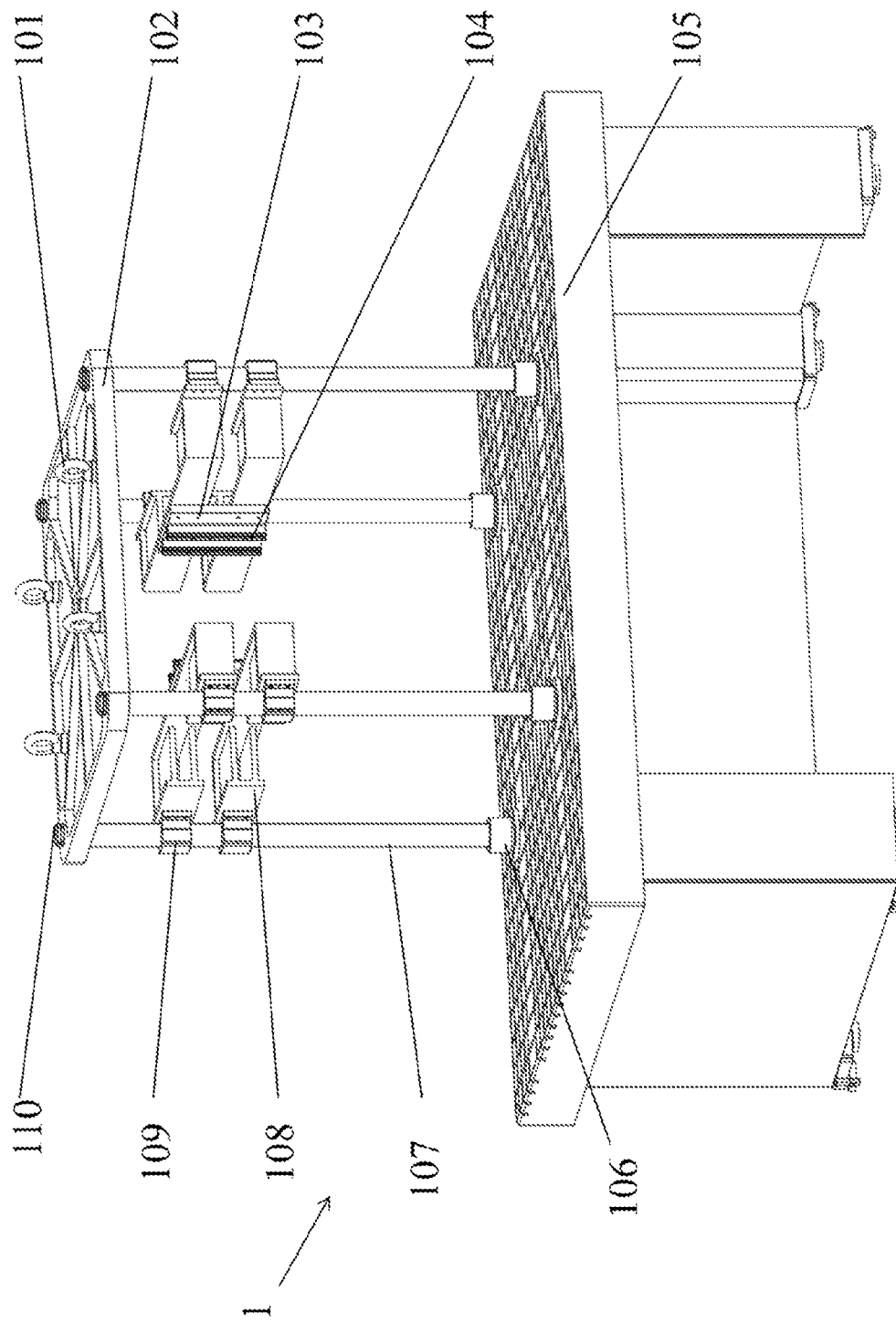
FIG. 2 shows a schematic diagram of a structure of a support frame module of the present disclosure.
Figure 3:
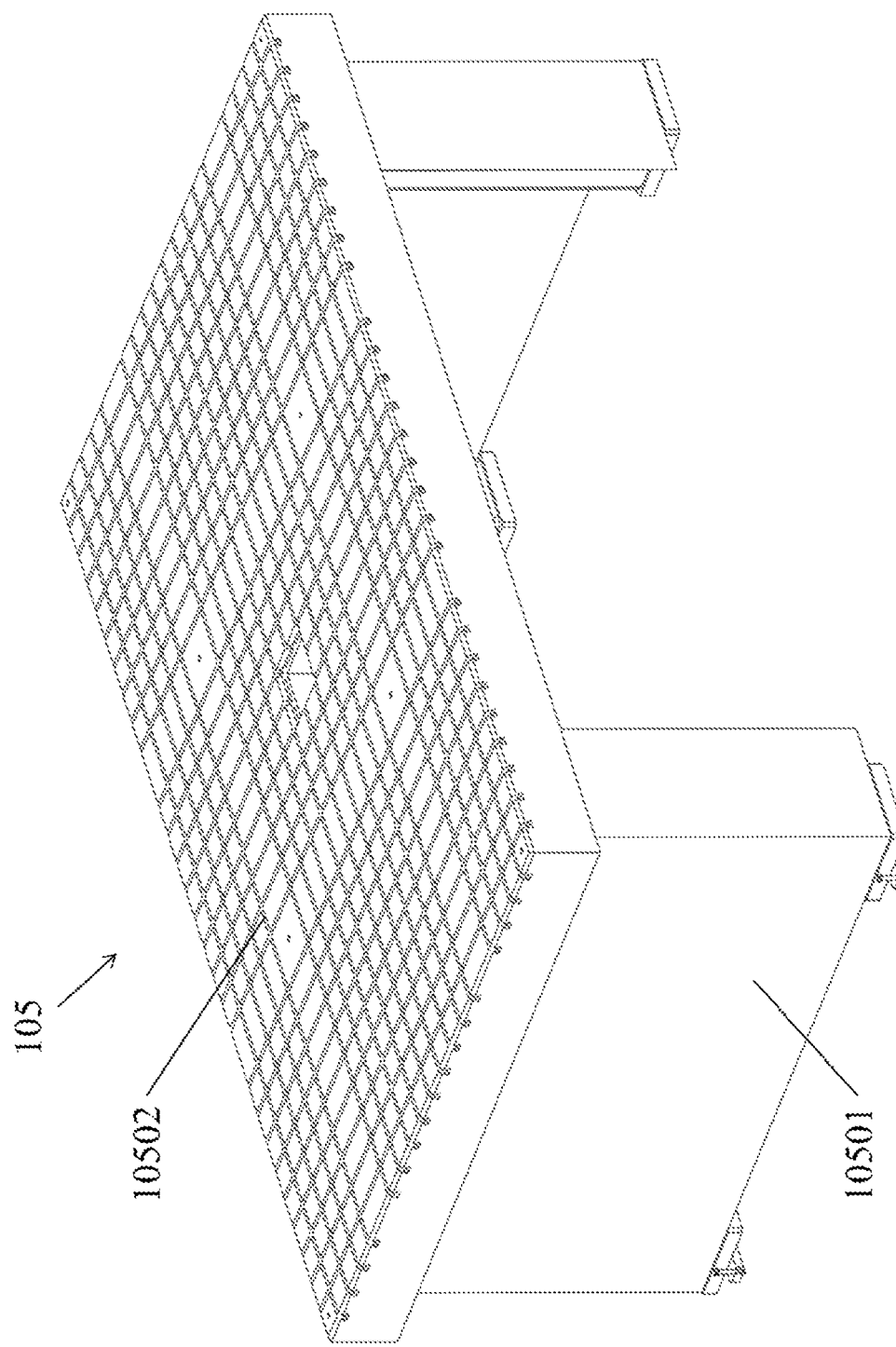
FIG. 3 shows a front view of a mounting platform of the present disclosure.
Figure 4:
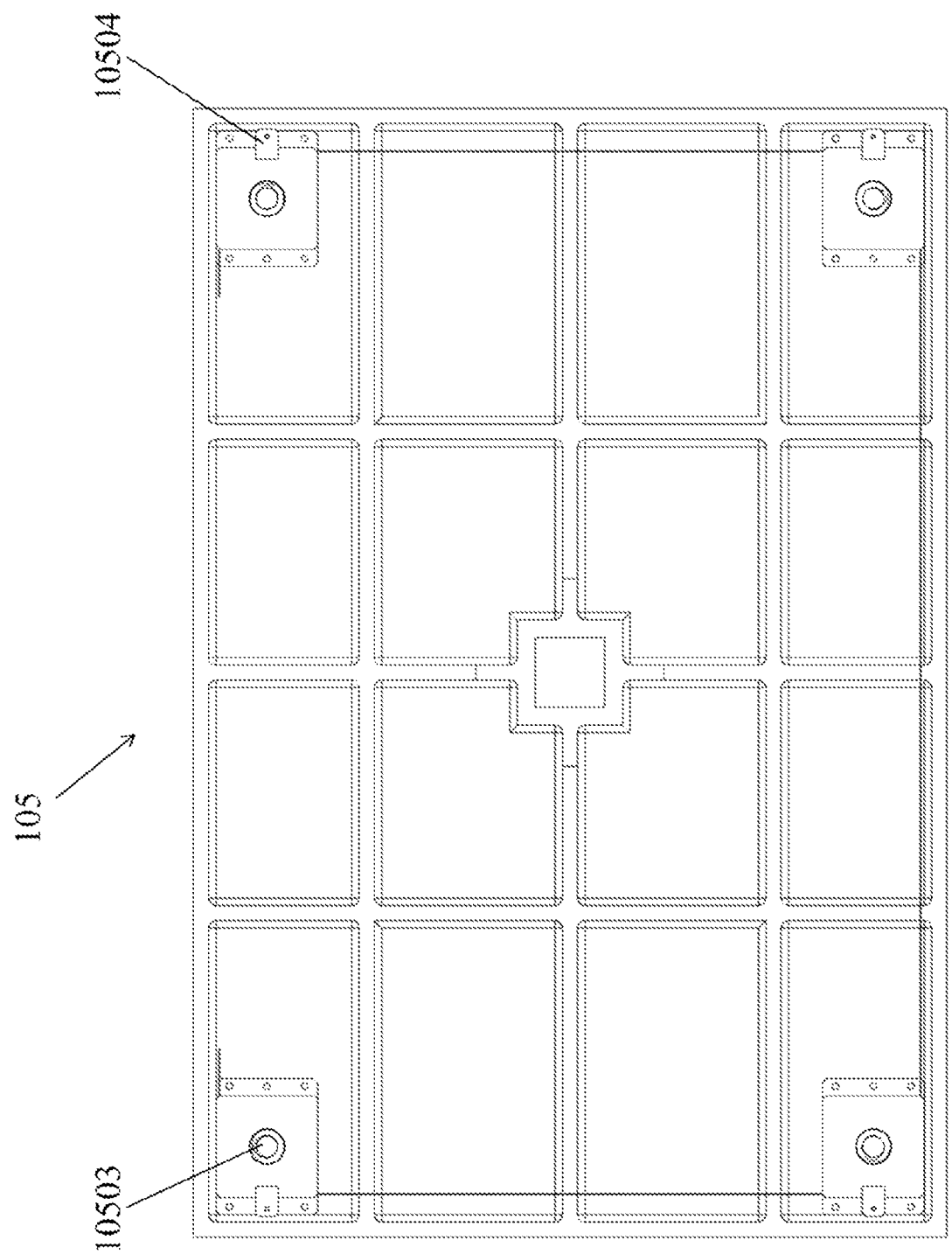
FIG. 4 shows a bottom view of the mounting platform of the present disclosure.

Referring to FIG. 2 to FIG. 4, the support frame module 1 has a four-pillar structure as a whole, to firmly support the high-frequency fatigue load applying module 2, the static-dynamic mechanical load applying module 3, the high/low temperature applying module 4, and the in-situ monitoring module 5. The support frame module 1 provides good vibration isolation, and precise installation and positioning. The support frame module 1 includes an eyebolt 101, a support plate 102, a rail base 103, a rail assembly I 104, a mounting platform 105, a fixing sleeve 106, a pillar 107, a mounting frame 108, a connecting block 109, a locking nut 110, a baffle 10501, a mounting table 10502, a vibration isolation spring 10503, an anchor screw 10504, etc. A lower end of the pillar 107 is in interference fit with the fixing sleeve 106, the fixing sleeve 106 is rigidly connected to the mounting platform 105 through a screw, and an upper end of the pillar 107 is rigidly connected to the support plate 102 through the locking nut 110. The connecting block 109 is fixed to the pillar 107, the mounting frame 108 is rigidly connected to the connecting block 109 through a screw, the rail base 103 is rigidly connected to the mounting frame 108 through a screw, and the rail assembly I 104 is rigidly connected to the rail base 103 through a screw. The eyebolt 101 is fixed to the support plate 102. The mounting platform 105 is isolated from vibration through the vibration isolation spring 10503, and is fixed to the ground through the anchor screw 10504. The mounting platform 105 is used to firmly support the remaining modules, provide good vibration isolation, and provide precise installation and positioning. An upper surface of the mounting table 10502 is machined with mutually perpendicular T-shaped grooves, to meet the needs of moving and positioning the remaining modules along the T-shaped grooves precisely, which may facilitate a later expansion and integration of the remaining modules, and is in line with an overall modular design concept of the instrument. A lower surface of the mounting table 10502 is machined with mutually perpendicular reinforcing ribs, to ensure a great rigidity. The mounting table 10502 is machined with a groove in the middle, to install and position the static-dynamic bending load applying sub-module 303. The baffle 10501 is fixedly connected to the mounting table 10502.

Figure 5:
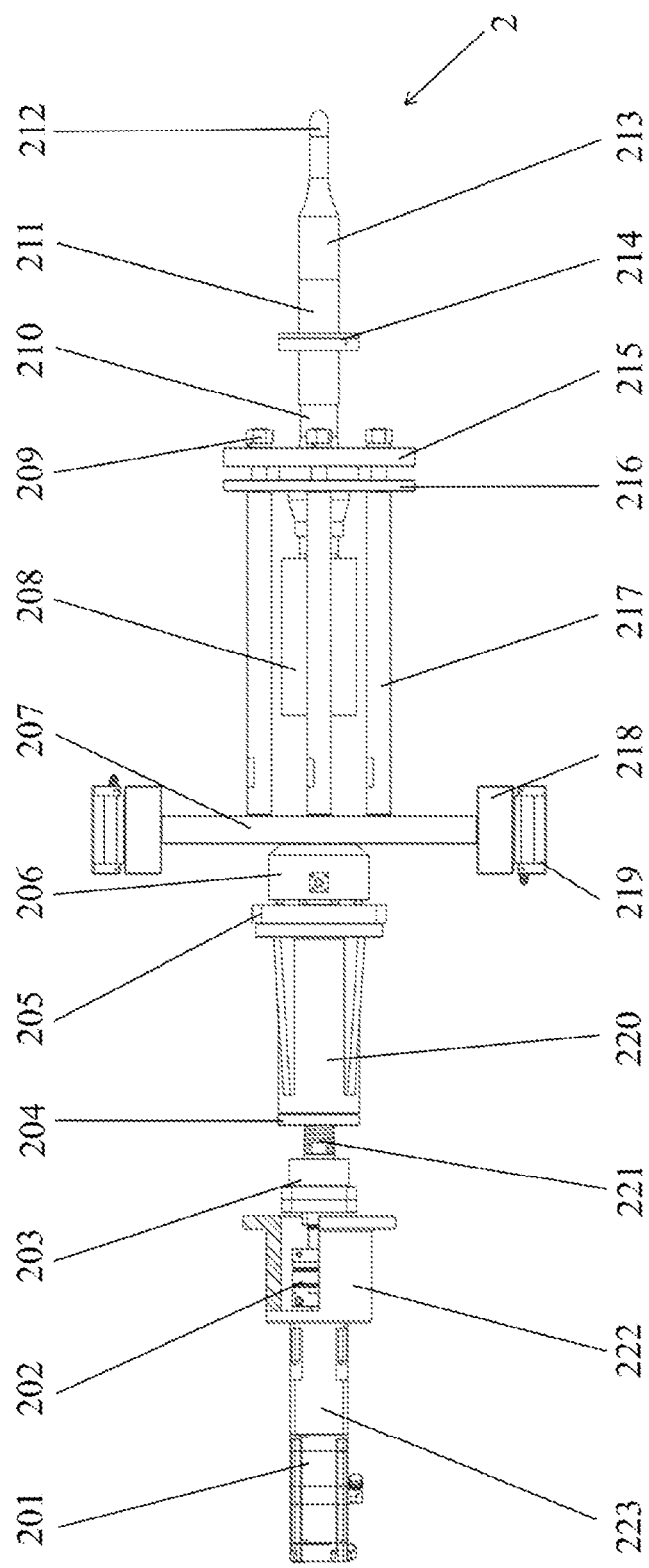
FIG. 5 shows a schematic diagram of a structure of a high-frequency fatigue load applying module of the present disclosure.

Referring to FIG. 5, the high-frequency fatigue load applying module 2 is vertically arranged above the instrument. The high-frequency fatigue load applying module 2 includes a servo motor 201, a coupling 202, a lead screw support unit 203, a lead screw nut 204, a connecting plate 205, a tension/compression sensor I 206, a mounting plate 207, an ultrasonic transducer 208, a bolt 209, an ultrasonic connector I 210, an ultrasonic connector II 211, an ultrasonic bending indenter 212, an ultrasonic probe 213, a connecting flange 214, a lower clamping plate 215, an upper clamping plate 216, a dowel rod 217, a slider support base 218, a slider assembly I 219, a connecting sleeve 220, a lead screw 221, a motor support base 222, a reducer 223, etc. The servo motor 201 is rigidly connected to the reducer 223 through a screw and is used to output stable driving torque. A housing of the reducer 223 is rigidly connected to the motor support base 222 through a screw, and an output shaft of the reducer 223 is connected to the coupling 202 through a flat key, so as to reduce a speed and increase a torque. The lead screw 221 is connected to the coupling 202 through a flat key, and an end of the lead screw 221 is fixed by the lead screw support unit 203. The lead screw 221 and the lead screw nut 204 form a lead screw nut pair used to convert rotary motion output by the servo motor 201 into linear motion. Both ends of the connecting sleeve 220 are rigidly connected to the screw nut 204 and the connecting plate 205 through screws, respectively, and both ends of the tension/compression sensor I 206 are respectively rigidly connected to the connecting plate 205 and the mounting plate 207 through screws. The slider support base 218 is rigidly connected to the mounting plate 207 and the slider assembly I 219 through screws. One end of the dowel rod 217 is rigidly connected to the mounting plate 207 through a thread, and the other end of the dowel rod 217 is rigidly connected to a shoulder of the ultrasonic connector I 210 through the upper clamping plate 216, the lower clamping plate 215, and the bolt 209, where the above-mentioned parts are used to apply a static bending preload on the tested sample 30108. Both ends of the ultrasonic connector I 210 are rigidly connected to the ultrasonic transducer 208 and the ultrasonic connector II 211 respectively, through double-ended studs; the connecting flange 214 is rigidly connected to the ultrasonic connector II 211 through a screw; both ends of the ultrasonic probe 213 are rigidly connected to the ultrasonic connector II 211 and the ultrasonic bending indenter 212 respectively, through double-ended studs, where the above-mentioned parts are used to apply a high-frequency fatigue load on the tested sample 30108.

The high-frequency fatigue load applying module 2 may be mounted and positioned through the rigid connection between the motor support base 222 and the support plate 102 of the support frame module 1. By matching the slider assembly I 219 and the rail assembly 1104 of the support frame module 1, the high-frequency fatigue load applying module 2 may be precisely guided in a load applying direction, and a lateral force influence generated during a test process may be eliminated. The high-frequency fatigue load applying module 2 with the high-temperature applying sub-module 401 may be sealed through the rigid connection between the connecting flange 214 and the welded bellows I 40101 of the high-temperature applying sub-module 401. The high-frequency fatigue load applying module 2 is driven by the servo motor 201, and a power is finally transmitted to the ultrasonic bending indenter 212 after being transmitted by parts such as the reducer 223, the coupling 202, the lead screw 221, so as to preload the static bending load on the tested sample 30108. The high-frequency fatigue load applying module 2 is driven by the ultrasonic transducer 208, where an amplitude is finally transmitted to the ultrasonic bending indenter 212 after being amplified step by step by the ultrasonic connector I 210, the ultrasonic connector II 211, and the ultrasonic probe 213, so as to apply the high-frequency fatigue load on the tested sample 30108.

Figure 6:
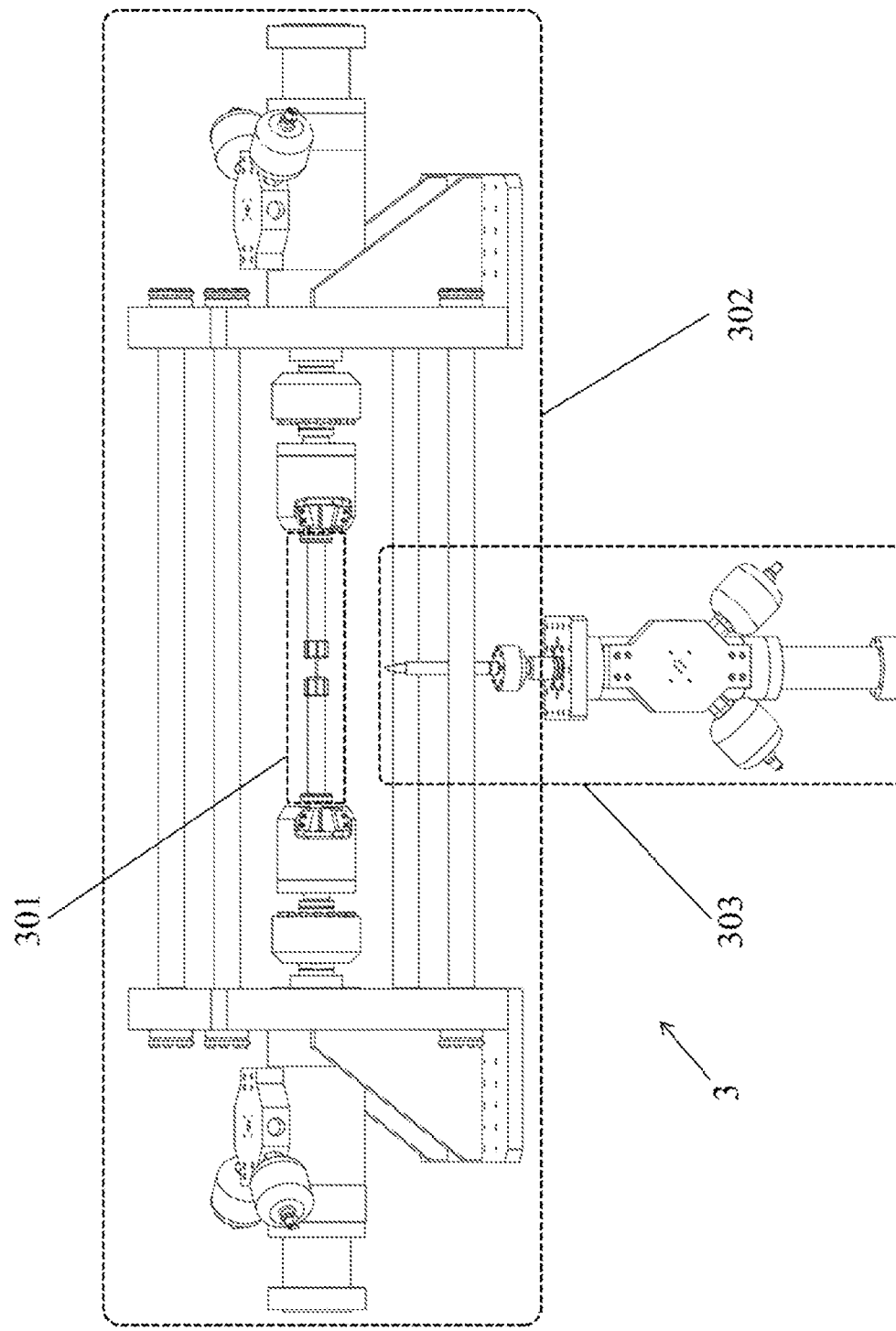
FIG. 6 shows a schematic diagram of a structure of a static-dynamic mechanical load applying module of the present disclosure.

Referring to FIG. 6, the static-dynamic mechanical load applying module 3 according to the present disclosure is arranged on the mounting platform 105. The static-dynamic mechanical load applying module 3 includes a high-temperature connecting rod assembly 301, a static-dynamic tension/compression load applying sub-module 302, and a static-dynamic bending load applying sub-module 303. The high-temperature connecting rod assembly 301 is used to ensure a normal use of the static-dynamic mechanical load applying module 3 in a high-temperature environment. The static-dynamic tension/compression load applying sub-module 302 is arranged horizontally, and is used to apply a static-dynamic tension/compression load on the tested sample 30108 through a rigid connection between the hydraulic cylinder fixing plate 30202 and an upper surface of the mounting platform 105. The static-dynamic bending load applying sub-module 303 is arranged vertically, and is used to apply a static-dynamic bending load on the tested sample 30108 through a rigid connection between the intermediate connecting plate 30303 and a lower surface of the mounting platform 105. The high-temperature connecting rod assembly 301 is firmly clamped on a hydraulic forced clamp 3020108 of the static-dynamic tension/compression load applying sub-module 302 as a whole, through an end of a high-temperature connecting rod I 30101 and an end of a high-temperature connecting rod II 30106. The high-temperature connecting rod assembly 301 is used to ensure a normal use of the static-dynamic mechanical load applying module 3 in a high-temperature environment.

A hydraulic cylinder assembly I 30201 and a hydraulic cylinder assembly II 30205 have exactly the same structure, and are arranged symmetrically with respect to the tested sample 30108. During the test, the hydraulic cylinder assembly I 30201 and the hydraulic cylinder assembly II 30205 may be individually operable to apply the static-dynamic tension/compression load on a single end of the tested sample 30108, or may be synchronously operable to apply the static-dynamic tension/compression load on both ends of the tested sample 30108 simultaneously, so as to ensure that a center of a gauge length section of the tested sample 30108 does not shift during the load applying process. The static-dynamic bending load applying sub-module 303 is arranged vertically below the instrument, and is rigidly connected to the lower surface of the mounting platform 105 through the intermediate connecting plate 30303. The static-dynamic bending load applying sub-module 303 may be individually operable to perform the static-dynamic bending load applying on the tested sample 30108, or may cooperate with the hydraulic cylinder assembly I 30201 and the hydraulic cylinder assembly II 30205 of the static-dynamic tension/compression load applying sub-module 302, so as to at most apply composite static-dynamic tension/compression-bending loads on the tested sample 30108 synchronously at both ends of the tested sample 30108, which may ensure that the center of the gauge length section of the tested sample 30108 does not shift during the process of applying the composite loads, facilitating an in-situ monitoring.

Figure 7:
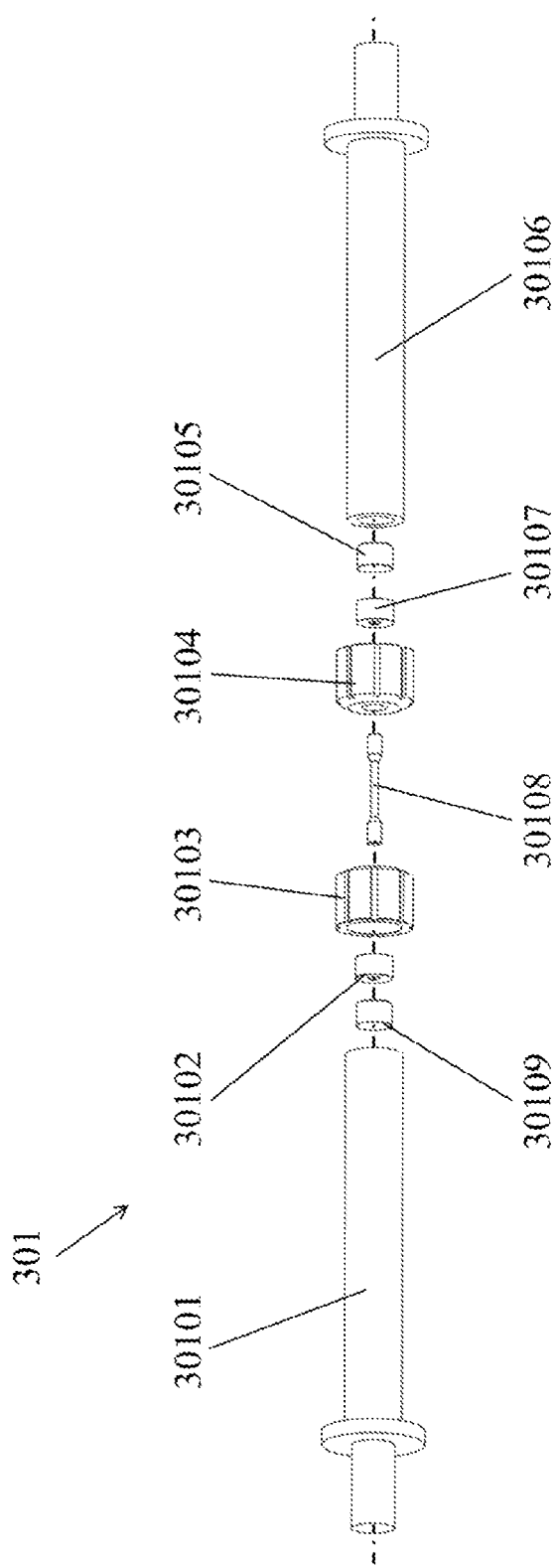
FIG. 7 shows an exploded view of a structure of a high-temperature connecting rod assembly of the present disclosure.

Referring to FIG. 7, the high-temperature connecting rod assembly 301 of the present disclosure includes the high-temperature connecting rod I 30101, a connector I 30102, a high-temperature connector I 30103, a high-temperature connector II 30104, a high-temperature pad II 30105, the high-temperature connecting rod II 30106, a connector II 30107, the tested sample 30108, a high-temperature pad I 30109, etc. The high temperature pad I 30109 and the high temperature pad II 30105 are in clearance fit with a mounting hole of the high-temperature connecting rod I 30101 and a mounting hole of the high-temperature connecting rod II 30106, respectively. The connector I 30102 and the connector II 30107 are matched with external threads of ends of the tested sample 30108 through internal threads of the connector I 30102 and the connector II 30107, and are in interference fit with the mounting hole of the high-temperature connecting rod I 30101 and the mounting hole of the high-temperature connecting rod II 30106, respectively. The high-temperature connector I 30103 and the high-temperature connector II 30104 are respectively fixed with external threads of ends of the high-temperature connecting rod I 30101 and the high-temperature connecting rod II 30106, through external threads of the high-temperature connector I 30103 and the high-temperature connector II 30104, so as to achieve anti-looseness during the process of applying the low-frequency fatigue load.

Figure 8:
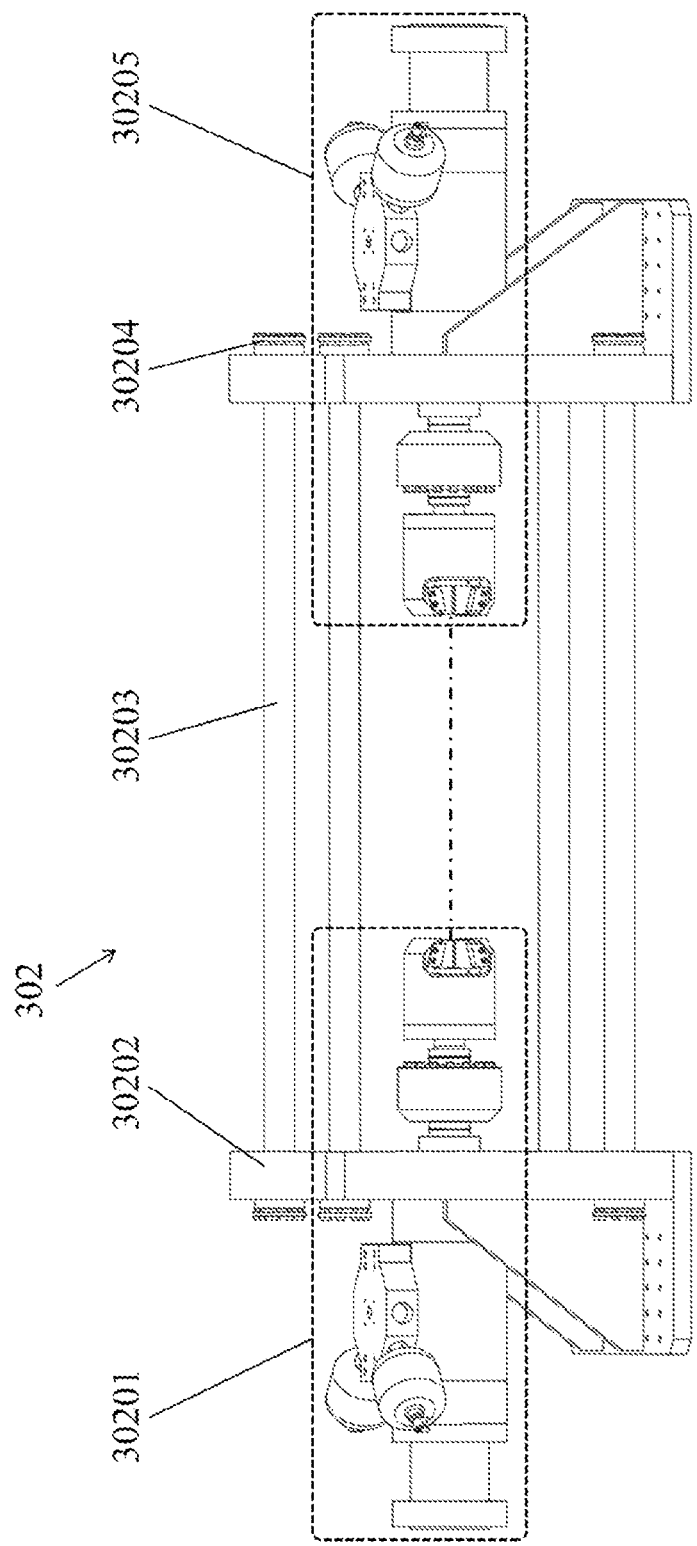
FIG. 8 shows a schematic diagram of a structure of a static-dynamic tension/compression load applying sub-module of the present disclosure.
Figure 9:
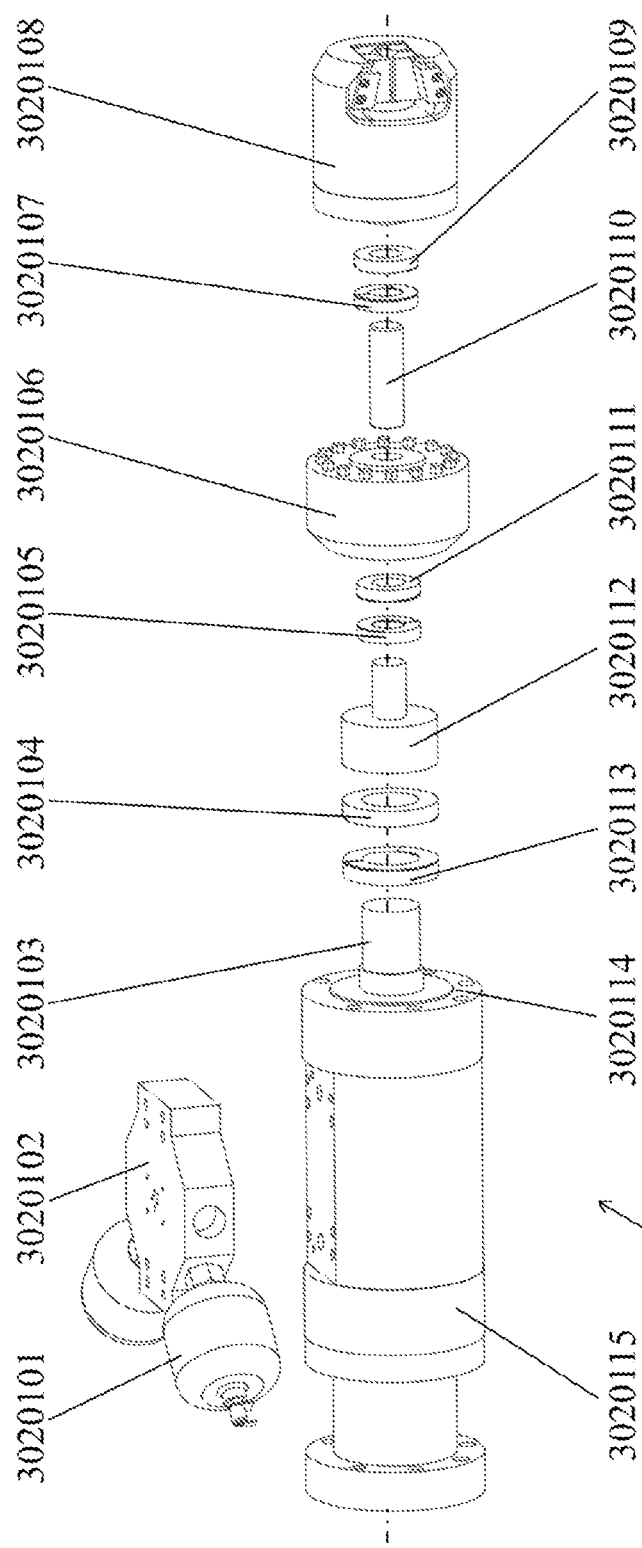
FIG. 9 shows an exploded view of a structure of a hydraulic cylinder assembly of the present disclosure.

Referring to FIG. 8 and FIG. 9, the static-dynamic tension/compression load applying sub-module 302 of the present disclosure includes a hydraulic cylinder assembly I 30201, a hydraulic cylinder fixing plate 30202, pull rods 30203, an expansion sleeve assembly 30204, a hydraulic cylinder assembly II 30205, etc. The hydraulic cylinder assembly I 30201 and the hydraulic cylinder assembly II 30205 are symmetrically arranged in a horizontal direction, and are rigidly connected to the hydraulic cylinder fixing plate 30202 through a hydraulic cylinder flange I 3020114 of the hydraulic cylinder assembly I 30201 and a hydraulic cylinder flange I 3020114 of the hydraulic cylinder assembly II 30205. The hydraulic cylinder fixing plate 30202 is rigidly connected to the mounting platform 105 through a T-bolt, and is rigidly connected to four pull rods 30203 through the expansion sleeve assembly 30204, so as to form a reinforced force closed-loop structure, which may greatly increase a rigidity of the static-dynamic tension/compression load applying sub-module 302. The hydraulic cylinder assembly I 30201 and the hydraulic cylinder assembly II 30205 may move toward each other along the pull rods 30203, so that relative positions of the hydraulic cylinder assembly I 30201 and the hydraulic cylinder assembly II 30205 may be precisely adjusted.

The hydraulic cylinder assembly I 30201 includes an accumulator assembly I 3020101, a valve plate assembly I 3020102, a piston rod I 3020103, a nut II 3020104, a nut III 3020105, a tension/compression sensor II 3020106, a nut V 3020107, a hydraulic forced clamp 3020108, a nut VI 3020109, a double-ended stud 3020110, a nut IV 3020111, an intermediate connecting rod I 3020112, a nut I 3020113, a hydraulic cylinder flange I 3020114, a hydraulic cylinder I 3020115, etc. The accumulator assembly I 3020101 is mounted on the valve plate assembly I 3020102, and the valve plate assembly I 3020102 is rigidly connected to the hydraulic cylinder I 3020115 through a screw. An external thread of one end of the piston rod I 3020103 and an internal thread of one end of the intermediate connecting rod I 3020112 are matched, and the piston rod I 3020103 and the intermediate connecting rod I 3020112 are locked and prevented from loosening through the nut I 3020113 and the nut II 3020104. An external thread of the other end of the intermediate connecting rod I 3020112 and an internal thread of one end of the tension/compression sensor II 3020106 are matched, and the intermediate connecting rod I 3020112 and the tension/compression sensor II 3020106 are locked and prevented from loosening through the nut III 3020105 and the nut IV 3020111. The other end of the tension/compression sensor II 3020106 and the hydraulic forced clamp 3020108 are rigidly connected through the double-ended stud 3020110, and the tension/compression sensor II 3020106 and the hydraulic forced clamp 3020108 are locked and prevented from loosening through the nut V 3020107 and the nut VI 3020109.

Figure 10:
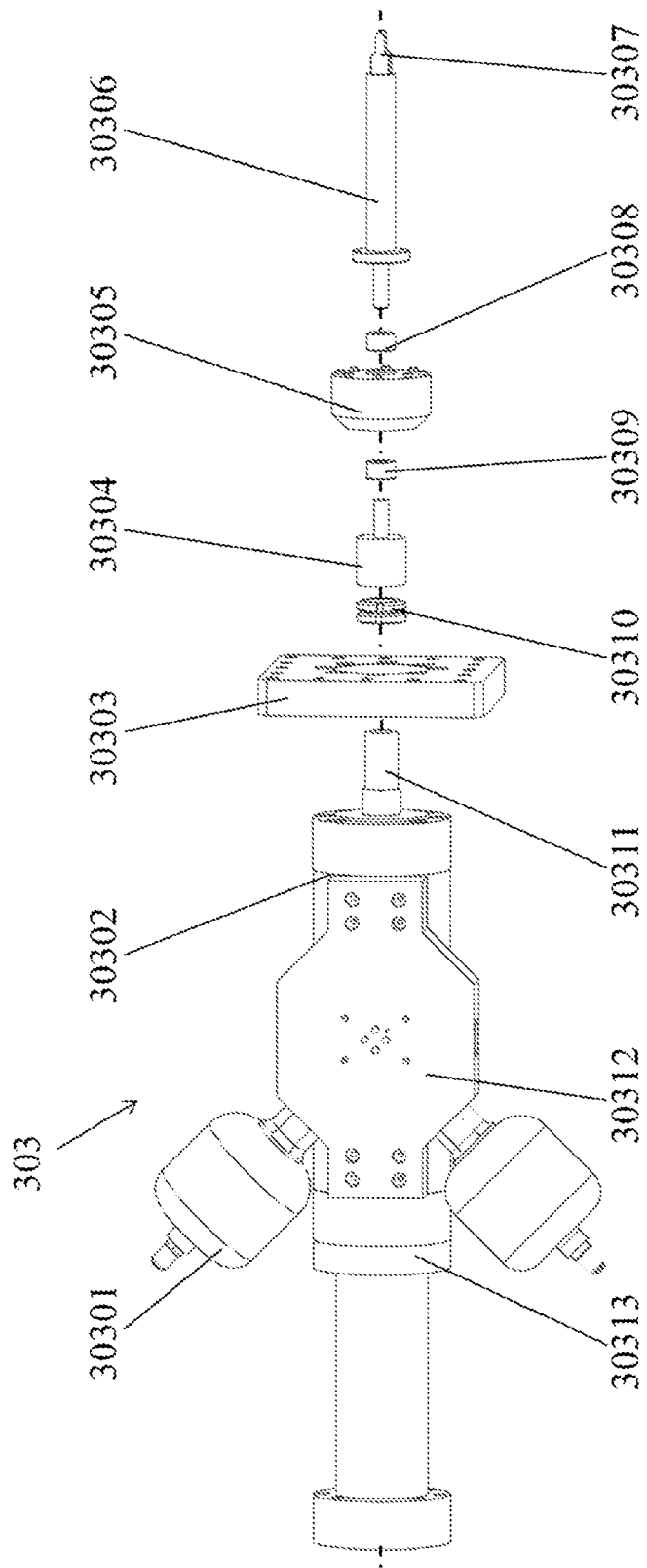
FIG. 10 shows an exploded view of a structure of a static-dynamic bending load applying sub-module of the present disclosure.

Referring to FIG. 10, the static-dynamic bending load applying sub-module 303 of the present disclosure includes an accumulator assembly II 30301, a hydraulic cylinder flange II 30302, an intermediate connecting plate 30303, an intermediate connecting rod II 30304, a tension/compression sensor III 30305, a high-temperature connecting rod III 30306, a bending indenter 30307, a nut IX 30308, a nut VIII 30309, a nut VII 30310, a piston rod II 30311, a valve plate assembly II 30312, a hydraulic cylinder II 30313, etc. The accumulator assembly II 30301 is mounted on the valve plate assembly II 30312, and the valve plate assembly II 30312 is rigidly connected to the hydraulic cylinder II 30313 through a screw. The hydraulic cylinder II 30313 is rigidly connected to the intermediate connecting plate 30303 through the hydraulic cylinder flange II 30302. An external thread of an end of the piston rod II 30311 and an internal thread of one end of the intermediate connecting rod II 30304 are matched, and the piston rod II 30311 and the intermediate connecting rod II 30304 are locked and prevented from loosening through the nut VII 30310. An external thread of the other end of the intermediate connecting rod II 30304 and an internal thread of one end of the tension/compression sensor III 30305 are matched, and the intermediate connecting rod II 30304 and the tension/compression sensor III 30305 are locked and prevented from loosening through the nut VIII 30309. An internal thread of the other end of the tension/compression sensor III 30305 and an external thread of one end of the high-temperature connecting rod III 30306 are matched, and the tension/compression sensor III 30305 and the high-temperature connecting rod III 30306 are locked and prevented from loosening through the nut IX 30308. The other end of the high-temperature connecting rod III 30306 is rigidly connected to the bending indenter 30307 through the double-ended stud.

Figure 11:
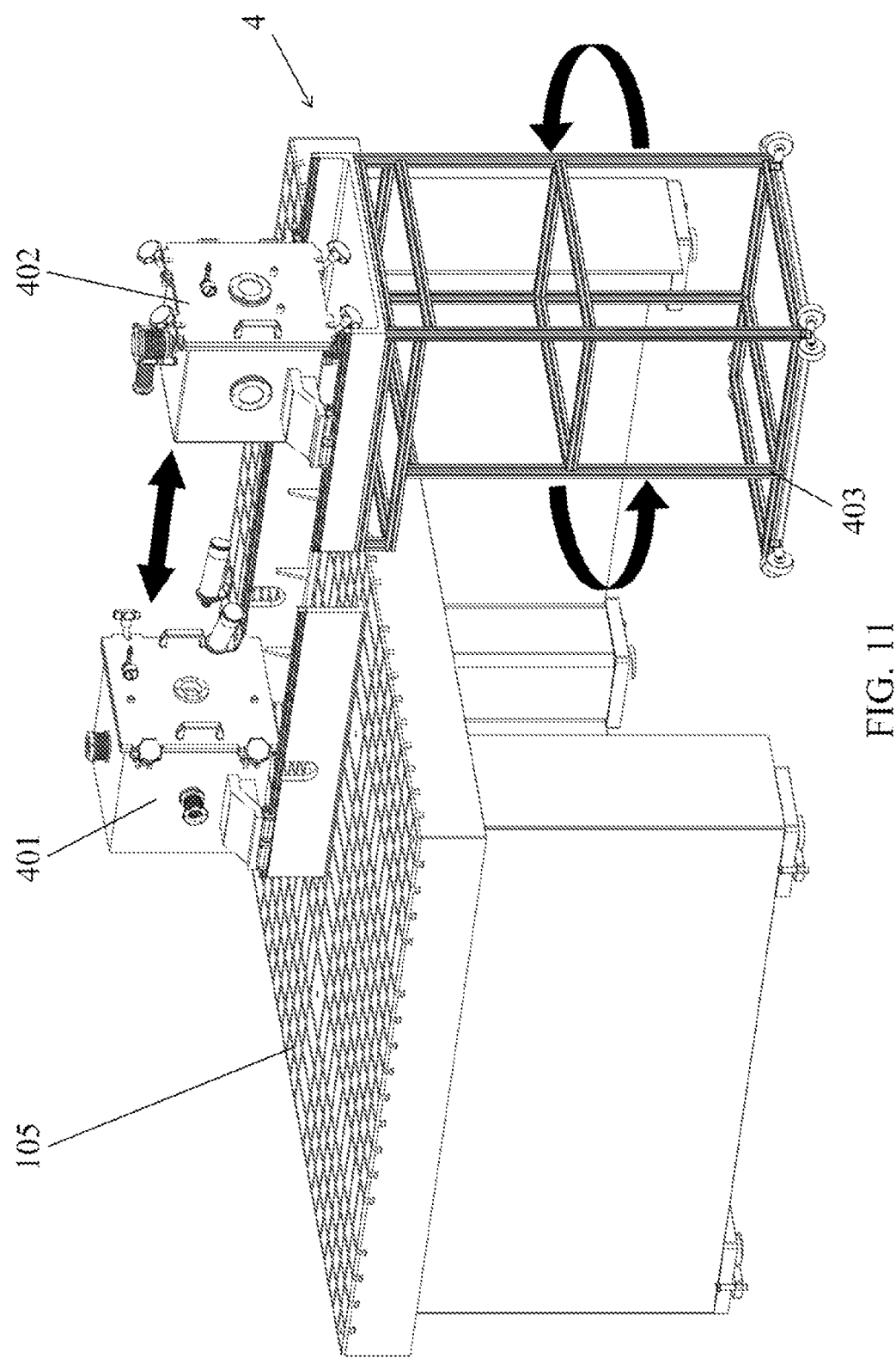
FIG. 11 shows a schematic diagram of a structure of a high/low temperature applying module of the present disclosure.
Figure 12:
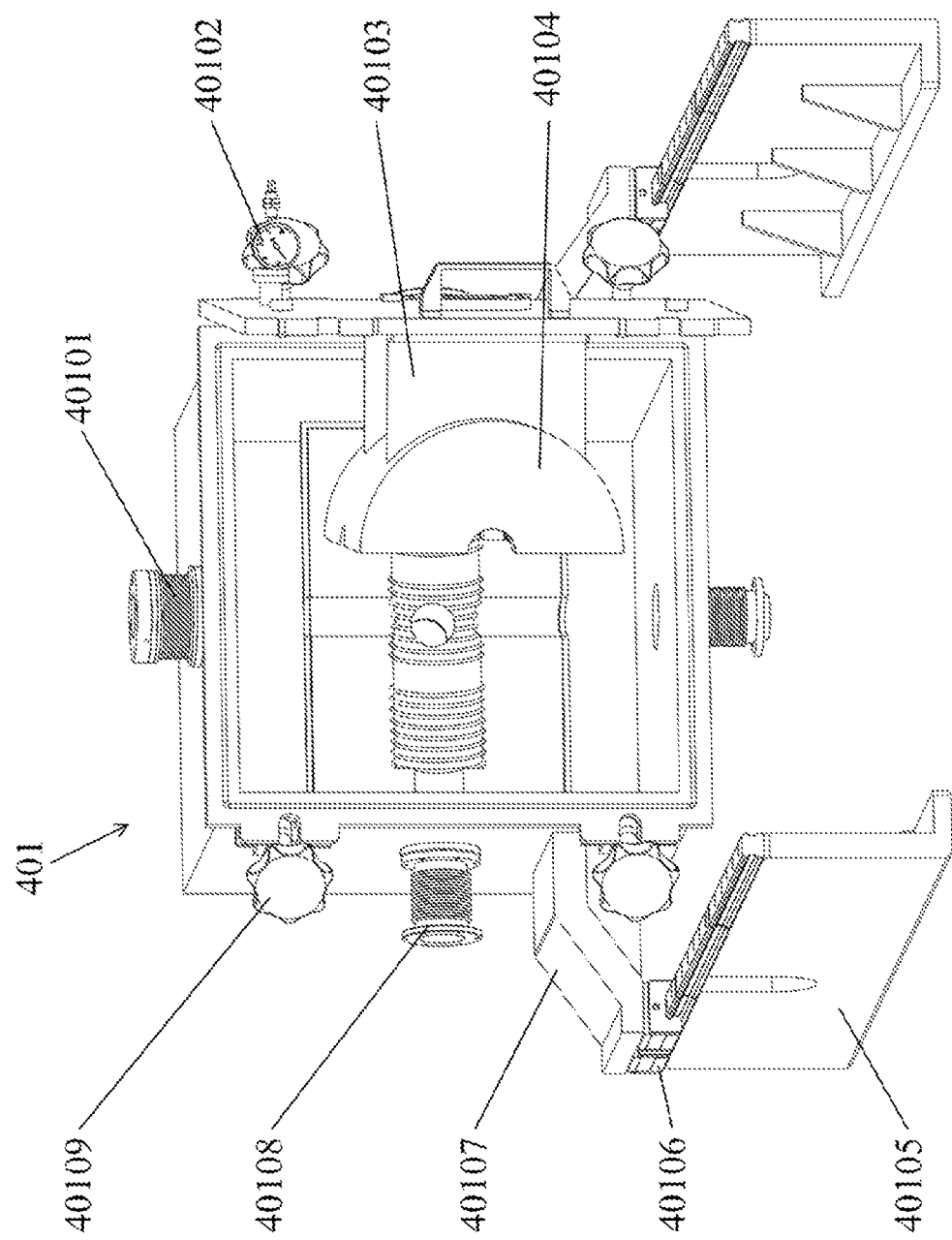
FIG. 12 shows a front view of a high-temperature applying module of the present disclosure.
Figure 13:
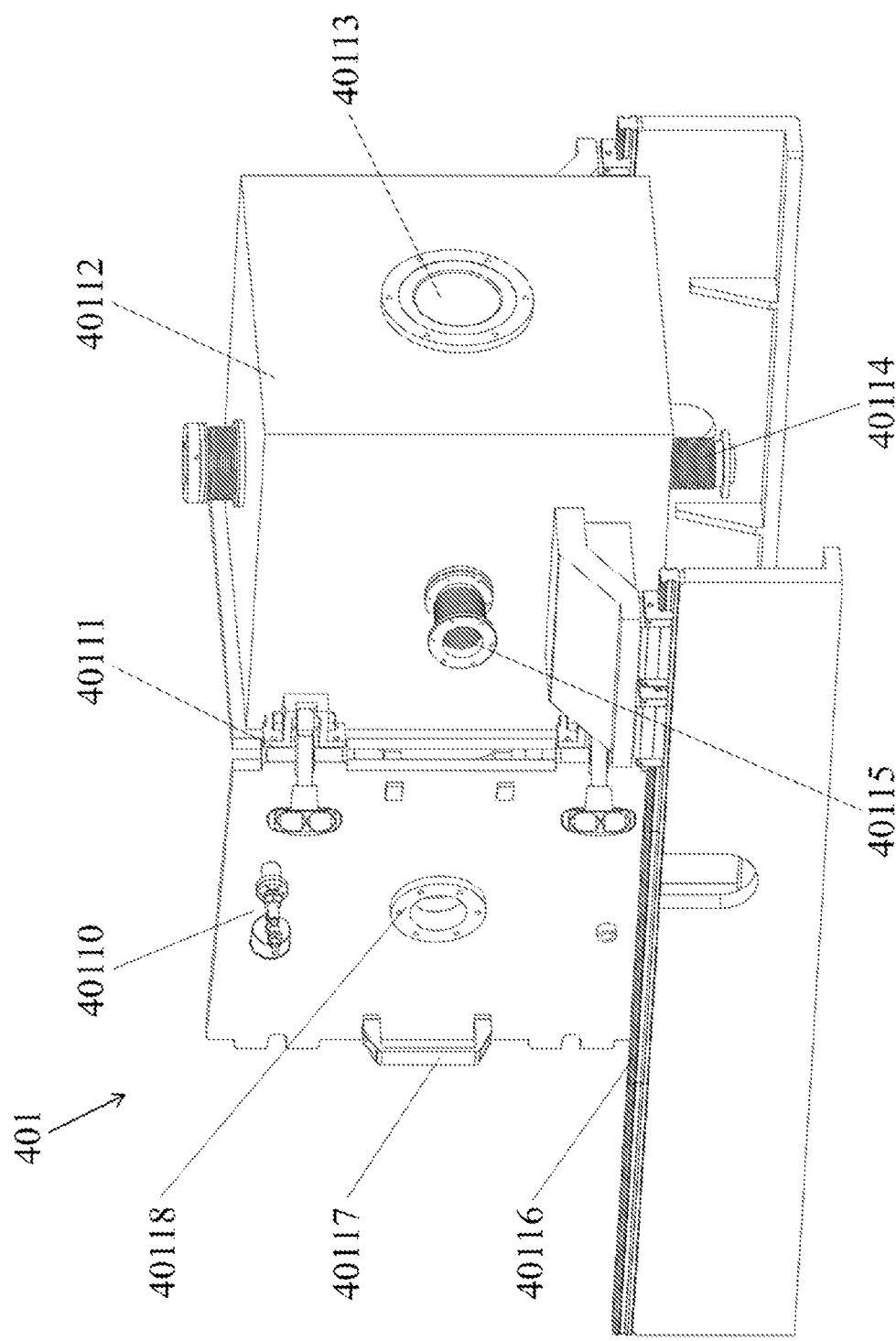
FIG. 13 shows is a rear view of a high-temperature applying module of the present disclosure.
Figure 14:
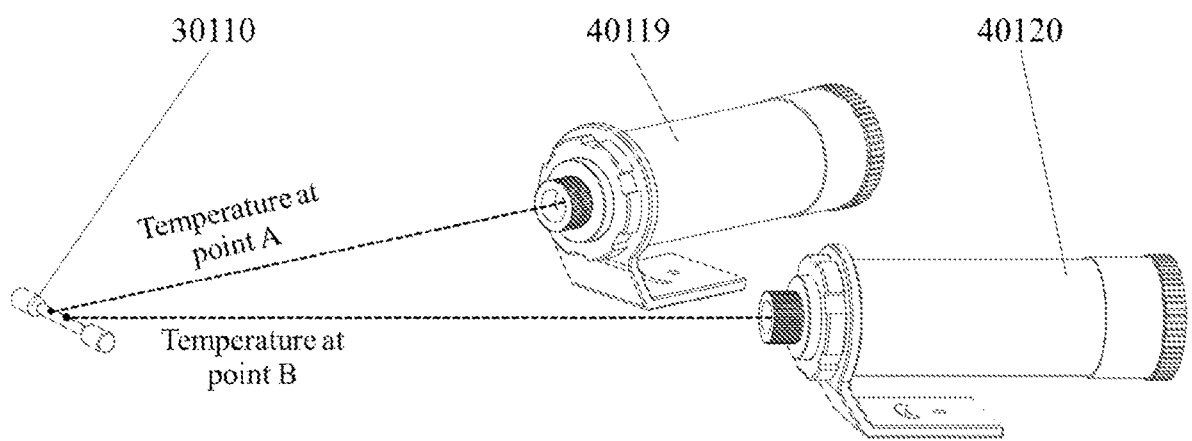
FIG. 14 shows a schematic diagram of a structure of an infrared temperature measurement assembly of the present disclosure.

Referring to FIG. 11, the high/low temperature applying module 4 of the present disclosure is used to form a vacuum or an inert gas atmosphere, so as to apply a variable temperature environment from a low temperature to a high temperature on the tested sample 30108. The high/low temperature applying module 4 includes the high-temperature applying sub-module 40, the low-temperature applying sub-module 402, the rotary cart 403, etc. The high-temperature applying sub-module 401 is used to apply a high-temperature environment ranging from the room temperature to 1200° C. on the tested sample 30108 under the vacuum or the inert gas atmosphere. The low-temperature applying sub-module 402 is used to apply a low-temperature environment ranging from the room temperature to −55° C. on the tested sample 30108 under the vacuum or the inert gas atmosphere. The rotary cart 403 is used to support the high-temperature applying sub-module 401 or the low-temperature applying sub-module 402, to switch between the high-temperature applying sub-module 401 and the low-temperature applying sub-module 402. The high-temperature applying sub-module 401 is rigidly connected to the mounting platform 105 of the support frame module 1 through the L-shaped rail base, and the low-temperature applying sub-module 402 is matched with the rail assembly III 40305 of the rotary cart 403 through the slider assembly III 40209. The rotary cart 403 may move through four rollers 40302, and a height of the rail assembly III 40305 and a level of the rail assembly III 40305 may be adjusted through four adjustment screws 40303. The high-temperature applying sub-module 401 and the low-temperature applying sub-module 402 may be switchable for use through the rotary cart 403, so as to apply the high/low temperature environment ranging from −55° C. to 1200° C. on the tested sample 30108 under vacuum or inert gas atmosphere with high precision and wide range.

Referring to FIG. 12 to FIG. 14, and FIG. 18, the high-temperature applying sub-module 401 of the present disclosure includes the welded bellows I 40101, a vacuum pressure gauge 40102, a furnace body support frame 40103, a heating furnace 40104, an L-shaped rail base 40105, a slider assembly II 40106, a chamber support frame I 40107, the welded bellows II 40108, a chamber door locker I 40109, a vacuum chamber door I 40110, a hinge I 40111, a vacuum chamber I 40112, a quartz observation window II 40113, the welded bellows III 40114, the welded bellows IV 40115, a rail assembly II 40116, a chamber door handle I 40117, a quartz observation window I 40118, an infrared colorimeter I 40119, an infrared colorimeter II 40120, etc. The chamber support frame I 40107 and the vacuum chamber I 40112 are welded together. The slider assembly II 40106 is rigidly connected to the chamber support frame I 40107 through a screw and is matched with the rail assembly II 40116. The rail assembly II 40116 is rigidly connected to the L-shaped rail base 40105 through a screw. The welded bellows I 40101, the welded bellows III 40114, the welded bellows II 40108, and the welded bellows IV 40115 are rigidly connected to upper, lower, left and right flanges of the vacuum chamber I 40112 through screws, respectively. The quartz observation window I 40118 is rigidly connected to a flange of the vacuum chamber door I 40110 through a screw, and the quartz observation window II 40113 is rigidly connected to a flange on a rear outer wall of the vacuum chamber I 40112 through a screw. The chamber door locker I 40109 is rigidly connected to the vacuum chamber I 40112 through a screw, so as to lock the vacuum chamber door I 40110. The chamber door handle I 40117 is rigidly connected to the vacuum chamber door I 40110 through a screw, and the hinge I 40111 is rigidly connected to the vacuum chamber door I 40110 and the vacuum chamber I 40112 through screws, so as to open and close the vacuum chamber door I 40110. The vacuum pressure gauge 40102 is installed on the vacuum chamber door I 40110, and is used to monitor an air pressure in the vacuum chamber I 40112 in real time. The furnace body support frame 40103 is rigidly connected to the vacuum chamber door I 40110 and an inner wall of the vacuum chamber I 40112 through screws, and the heating furnace 40104 and the furnace body support frame 40103 are welded together. During the test, a temperature controller applies voltages of different values to three sections of resistance wires in the heating furnace 40104, to heat the heating furnace 40104, and the high-temperature environment of different temperatures is applied on the tested sample 30108 by means of thermal radiation. The infrared colorimeter I 40119 and the infrared colorimeter II 40120 are arranged in front of the vacuum chamber I 40112 at a certain angle. A temperature of the gauge length section of the tested sample 30108 may be monitored in real time through the quartz observation window I 40118, and an average value of the temperature is determined and fed back to the temperature controller, so as to form a closed-loop control.

Figure 15:
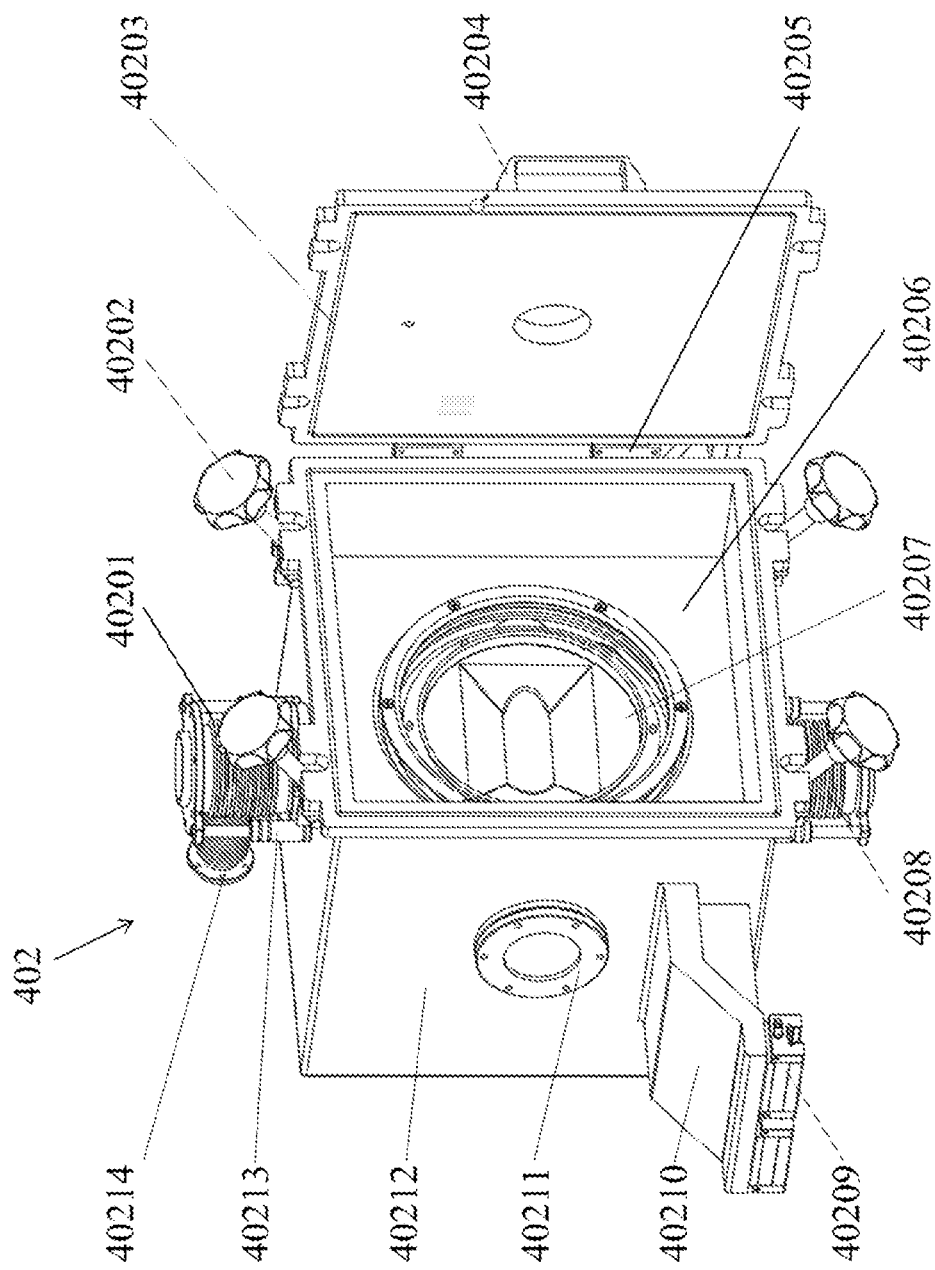
FIG. 15 shows a schematic diagram of a structure of a low-temperature applying module of the present disclosure.
Figure 19:
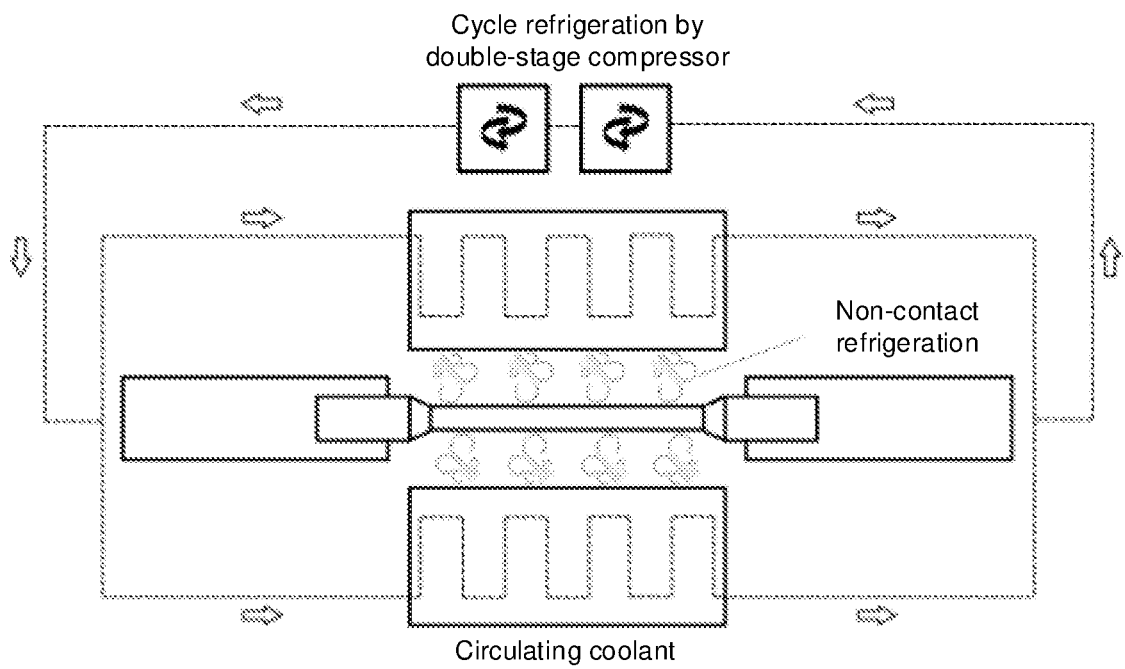
FIG. 19 shows a schematic diagram of a principle of applying a low temperature of the present disclosure.

Referring to FIG. 15 and FIG. 19, the low-temperature applying sub-module 402 of the present disclosure includes welded bellows V 40201, a chamber door locker II 40202, a vacuum chamber door II 40203, a chamber door handle II 40204, a hinge II 40205, a refrigeration chamber support base 40206, a refrigeration chamber 40207, welded bellows VI 40208, a slider assembly III 40209, a chamber support frame II 40210, a quartz observation window III 40211, a vacuum chamber II 40212, a gas spring assembly 40213, a vacuum bellows assembly 40214, etc. The chamber support frame II 40210 and the vacuum chamber II 40212 are welded together, and the slider assembly III 40209 is rigidly connected to the chamber support frame II 40210 through a screw. The chamber door locker II 40202 is rigidly connected to the vacuum chamber II 40212 through a screw, so as to lock the vacuum chamber door II 40203. The chamber door handle II 40204 is rigidly connected to the vacuum chamber door II 40203 through a screw, and the hinge II 40205 is rigidly connected to the vacuum chamber door II 40203 and the vacuum chamber II 40212 through screws, so as to open and close the vacuum chamber door II 40203. The welded bellows V 40201, the welded bellows VI 40208, and the vacuum bellows assembly 40214 are rigidly connected to the vacuum chamber II 40212 through screws, and the gas spring assembly 40213 is rigidly connected to the welded bellows VI 40208 and the vacuum chamber II 40212 through screws. The quartz observation window III 40211 is rigidly connected to the vacuum chamber II 40212 through a screw. The refrigeration chamber support base 40206 is rigidly connected to an inner wall of the vacuum chamber II 40212 through a screw, and the refrigeration chamber 40207 is rigidly connected to the refrigeration chamber support base 40206 through a screw. During the test, a cooling liquid is circulated into the refrigeration chamber 40207 through a two-stage compressor, the low-temperature environment may be applied to the tested sample 30108 by a non-contact method, and the lowest temperature may reach −55° C.

Figure 16:
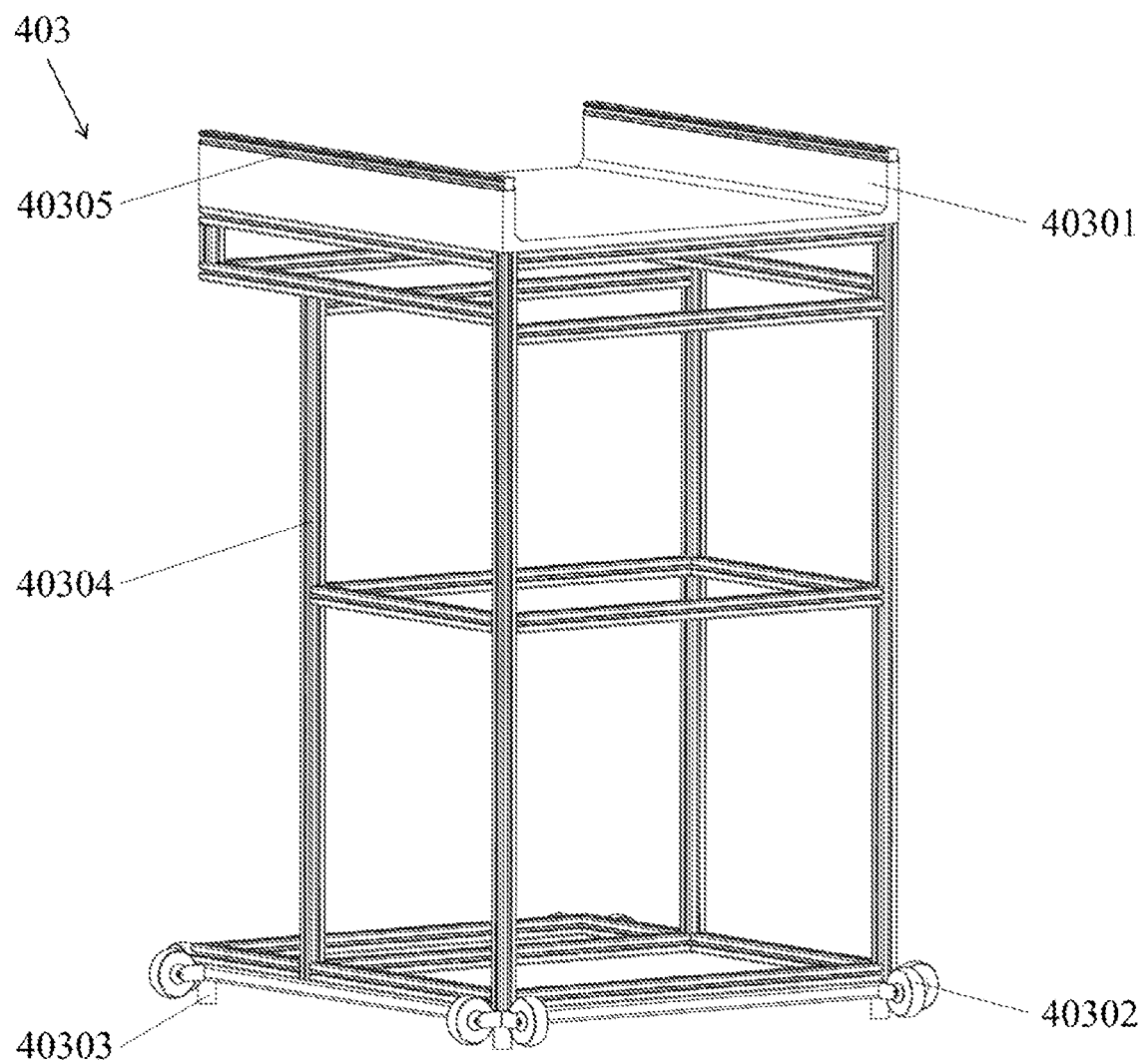
FIG. 16 shows a schematic diagram of a structure of a rotary cart of the present disclosure.

Referring to FIG. 16, the rotary cart 403 of the present disclosure includes a rail base 40301, rollers 40302, adjusting screws 40303, a support frame 40304, a rail assembly III 40305, etc. The rail base 40301 is rigidly connected to an upper end of the support frame 40304 through a screw, and the rail assembly III 40305 is rigidly connected to the rail base 40301 through a screw. The roller 40302 is rigidly connected to a lower end of the support frame 40304 through a screw, so as to achieve a movement and a rotation of the rotary cart 403. The adjustment screw 40303 is fixed to the lower end of the support frame 40304. A height of the rail assembly III 40305 and a level of the rail assembly III 40305 may be adjusted by adjusting the adjustment screws 40303, which is convenient for switching between the high-temperature applying sub-module 401 and the low-temperature applying sub-module 402.

Figure 17:
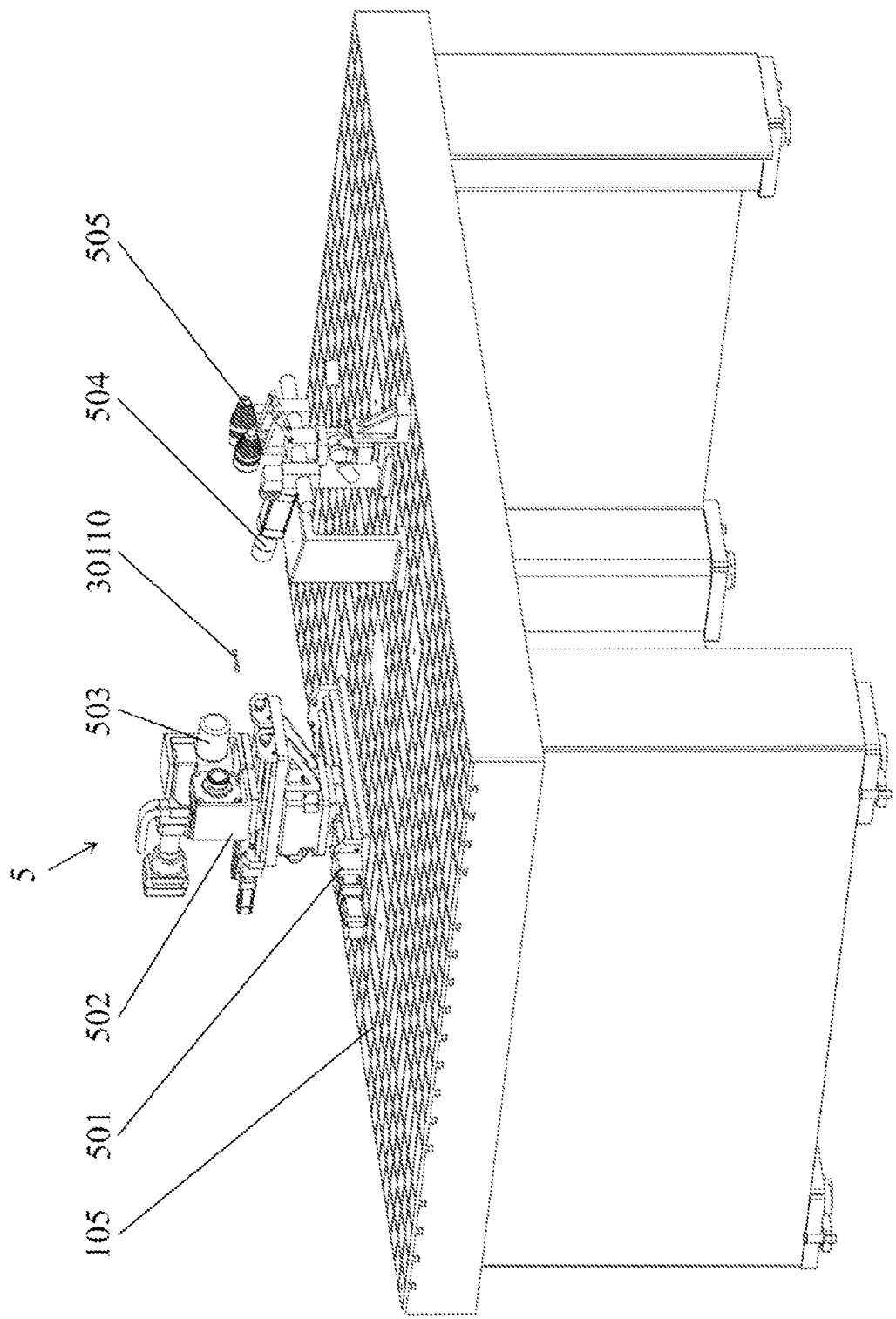
FIG. 17 shows a schematic diagram of a structure of an in-situ monitoring module of the present disclosure.
Figure 22:
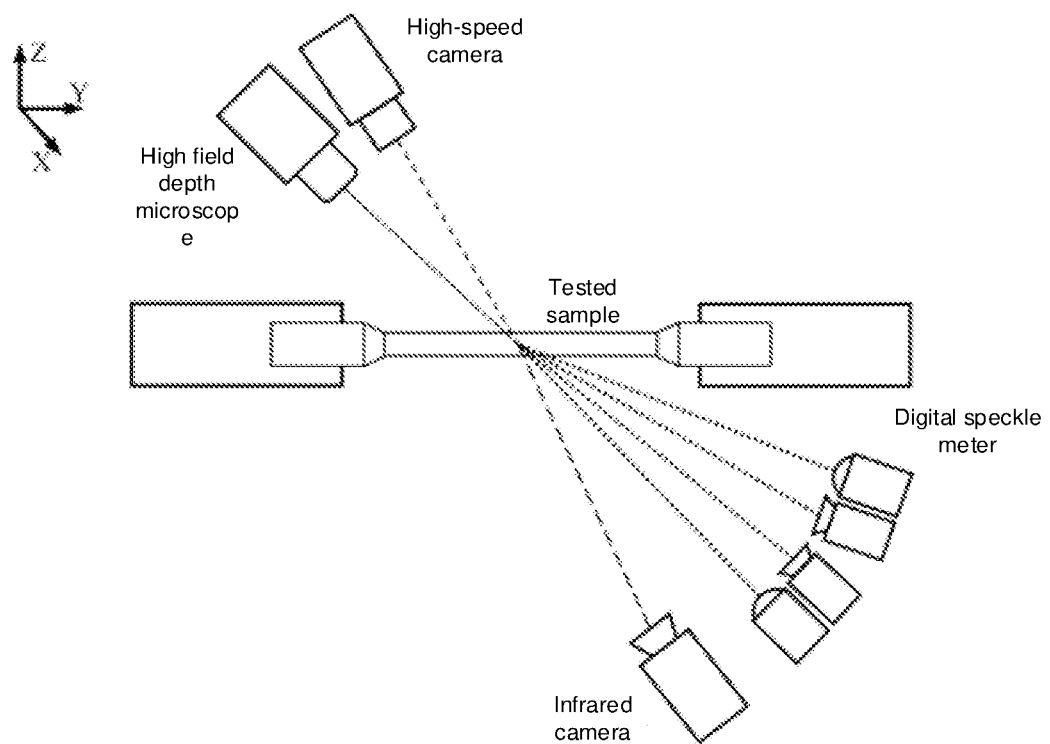
FIG. 22 shows a schematic diagram of a principle of monitoring in situ with multiple parameters of the present disclosure.
Figure 23:
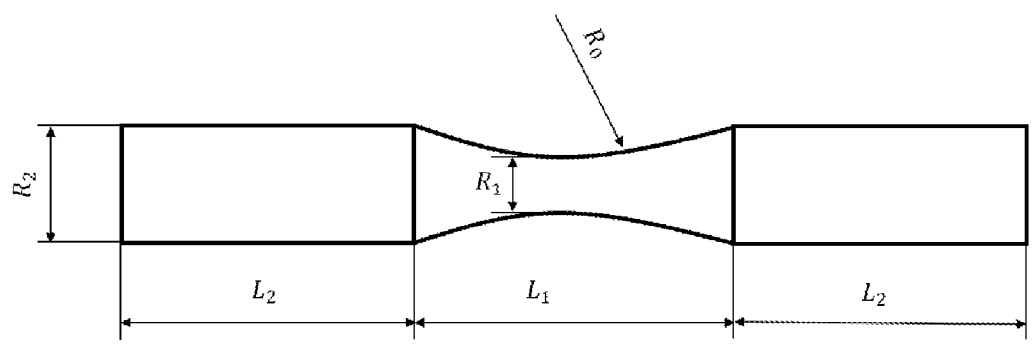
FIG. 23 shows a schematic diagram of a structure of an hourglass type ultrasonic sample of the present disclosure.
Figure 24:
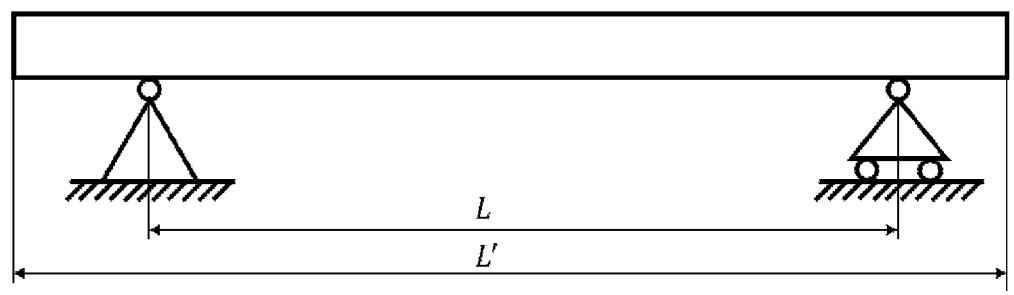
FIG. 24 shows a schematic diagram of a structure of an ultrasonic bending sample of the present disclosure.

Referring to FIG. 17 and FIG. 22, the in-situ monitoring module 5 of the present disclosure includes a three-degree-of-freedom motion platform 501, a surface deformation damage measurement assembly 502, a microstructure measurement assembly 503, an internal damage detection assembly 504, and a three-dimensional strain measurement assembly 505. The internal damage detection assembly 504 and the three-dimensional strain measurement assembly 505 are arranged in front of the high-temperature applying sub-module 401, and are respectively used to dynamically monitor the global temperature information, internal damage information, and three-dimensional strain information of the gauge length section of the tested sample 30108. The surface deformation damage measurement assembly 502 and the microstructure measurement assembly 503 are arranged on the three-degree-of-freedom motion platform 501 behind the high-temperature applying sub-module 401, and the three-degree-of-freedom motion platform 501 is rigidly connected to the mounting platform 105 through a screw. Through the three-degree-of-freedom motion platform 501, the surface deformation damage measurement assembly 502 and the microstructure measurement assembly 503 are switchable, and relative positions of the surface deformation damage measurement assembly 502 and the microstructure measurement assembly 503 along axial and radial directions of the tested sample 30108 may be precisely adjusted, so as to monitor the global surface deformation damage information of the gauge length section of the tested sample 30108 in real time, and performing a follow-up monitoring of a micro-area morphology of the gauge length section. The four in-situ monitoring measures including the surface deformation damage measurement assembly 502, the microstructure measurement assembly 503, the internal damage detection assembly 504, and the three-dimensional strain measurement assembly 505 may be used individually, in a pairwise combination, or in a combination of at most three at the same time, so as to dynamically monitor the microstructure evolution of the tested sample 30108 and the fatigue failure mode of the tested sample 30108 in situ.

Figure 20:
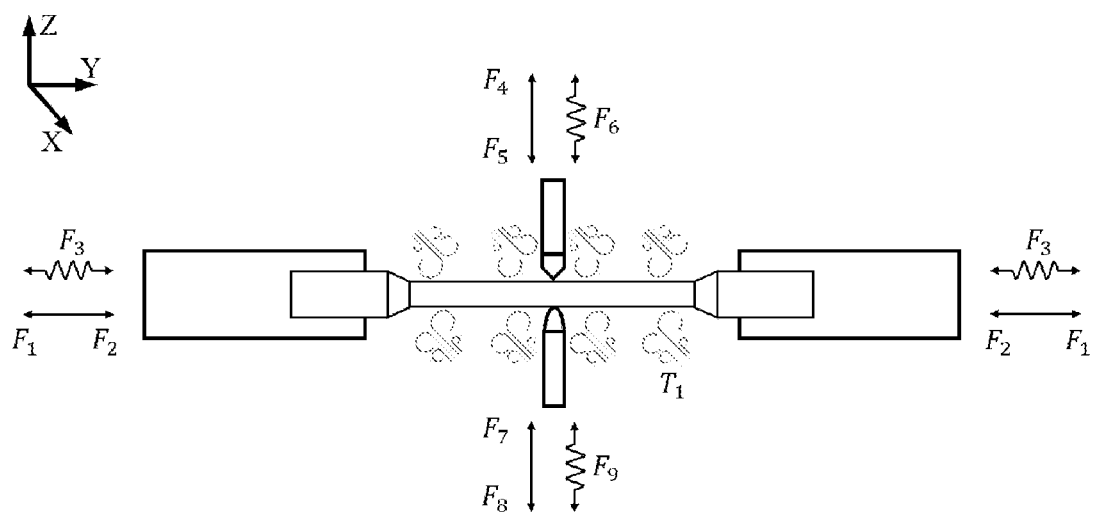
FIG. 20 and FIG. 21 show schematic diagrams of a principle of applying composite multiple loads in a high/low temperature environment of the present disclosure.
Figure 21:
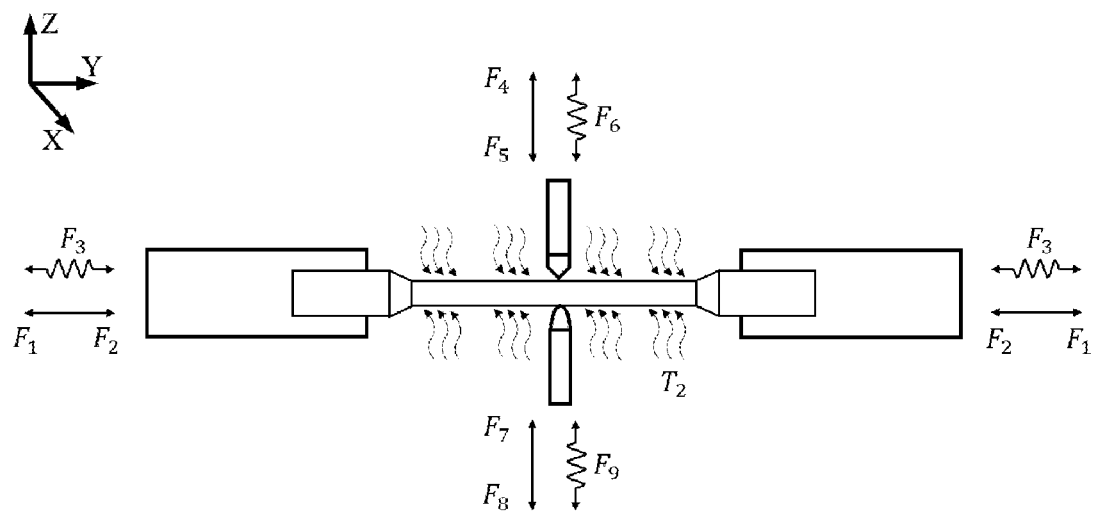

Referring to FIG. 20 and FIG. 21, $F_1$ represents a static tension load, $F_2$ represents a static compression load, $F_3$ represents a low-frequency tension/compression load, $F_4$, $F_5$, $F_7$ and $F_8$ represents static bending loads, $F_6$ represents an ultrasonic fatigue load, and $F_9$ represents a low-frequency bending load.

Referring to FIG. 1 to FIG. 24, the present disclosure provides a method for mechanical properties in situ testing of materials under a high temperature and complex mechanical loads. The method includes the following specific steps when an in-situ test for mechanical properties of materials at high temperature and high frequency is conducted.

In step 1, the tested sample 30108 is installed. A thread of a clamped end of the tested sample 30108 is matched with an internal thread of the connector I 30102 and an internal thread of the connector II 30107, the connector I 30102 and the connector II 30107 are respectively mounted in the mounting hole at an end of the high-temperature connecting rod I 30101 and the mounting hole at an end of the high-temperature connecting rod II 30106, and the high-temperature connector I 30103 and the high-temperature connector II 30104 are tightened, so as to install the tested sample 30108.

In step 2, high-temperature environment is applied on the tested sample 30108 by the high-temperature applying submodule 401. The vacuum chamber I 40112 is evacuated by a mechanical pump (external device), or an inert gas is continuously introduced into the vacuum chamber I 40112 to exhaust the air (oxygen) in the vacuum chamber I 40112, forming an inert gas atmosphere. The temperature controller applies voltages of different values to the three sections of resistance wires in the heating furnace 40104, so as to heat the heating furnace 40104, and a high-temperature environment of different temperatures may be applied on the tested sample 30108 by means of thermal radiation. The infrared colorimeter I 40119 and the infrared colorimeter II 40120 monitor a temperature of the gauge length section of the tested sample 30108 in real time, and an average value of the temperature is determined and fed back to the temperature controller, so as to form a closed-loop control.

In step 3, static tension/compression loads are synchronously applied on both ends of the tested sample 30108 by the static-dynamic tension/compression load applying submodule 302. A motion controller (external device) controls a high-pressure hydraulic oil to drive the piston rod I 3020103 of the hydraulic cylinder assembly I 30201 and the piston rod I 3020103 of the hydraulic cylinder assembly II 30205 to move toward each other synchronously. Through a transmission by the intermediate connecting assembly, hydraulic forced clamps 3020108 are driven to move synchronously toward each other, and finally both ends of the high-temperature connecting rod assembly 301 are driven to move synchronously toward each other, so as to apply the static tension/compression loads synchronously on both ends of the tested sample 30108.

In step 4, a static bending load is applied on the tested sample 30108 by the high-frequency fatigue load applying module 2. A power output by the servo motor 201 is finally transmitted to the ultrasonic bending indenter 212 after being multi-stage decelerated by the reducer 223, a conversion by the lead screw 221, and the lead screw nut 204, and being transmitted by the connecting sleeve 220, the connecting plate 205, the tension/compression sensor I 206, the mounting plate 207, the dowel rod 217, the upper clamping plate 216, the lower clamping plate 215, the ultrasonic connector I 210, the ultrasonic connector II 211, and the ultrasonic probe 213, so as to preload a static bending load on the tested sample 30108.

In step 5, an ultrasonic fatigue load is applied on the tested sample 30108 by the high-frequency fatigue load applying module 2. A weak amplitude output by the ultrasonic transducer 208 is finally transmitted to the ultrasonic bending indenter 212 after being amplified step by step by the ultrasonic connector I 210, the ultrasonic connector II 211, and the ultrasonic probe 213, and the weak amplitude, so as to apply a high-frequency fatigue load on the tested sample 30108.

In step 6, the tested sample 30108 is dynamically monitored by the in-situ monitoring module 5. The internal damage detection assembly 504 and the three-dimensional strain measurement assembly 505 are used to dynamically monitor the global temperature information, internal damage information, and three-dimensional strain information of the gauge length section of the tested sample 30108. Through the three-degree-of-freedom motion platform 501, the surface deformation damage measurement assembly 502 and the microstructure measurement assembly 503 are switchable for use, and the relative positions of t the surface deformation damage measurement assembly 502 and the microstructure measurement assembly 503 along an axial direction and a radial direction of the tested sample 30108 may be precisely adjusted, so as to monitor the global surface deformation damage information of the gauge length section of the tested sample 30108 in real time, and performing the follow-up monitoring of the micro-area morphology of the gauge length section. Four in-situ monitoring measures including the surface deformation damage measurement assembly 502, the microstructure measurement assembly 503, the internal damage detection assembly 504, and the three-dimensional strain measurement assembly 505 may be used individually, in a pairwise combination, or in a combination of at most three at the same time, so as to dynamically monitor the microstructure evolution of the tested sample 30108 and a fatigue failure mode of the tested sample 30108 in situ.

In the instrument for mechanical properties in situ testing of materials under a high temperature and complex mechanical loads of the present disclosure, a combination of other forms of static-dynamic mechanical loads may be applied, on the basis of applying a tension/compression preload, and a vacuum sealed environment and an inert gas atmosphere may be formed at the same time, to apply the variable temperature environment from a low temperature to a high temperature. The instrument may conduct a test of applying complex loads with a high/low temperature "high temperature (low temperature)-tension (compression)-tension (compression)-bending-low-frequency fatigue" or "high temperature (low temperature)-tension (compression)-tension (compression)-bending-high-frequency fatigue", with rich test conditions built, and rich mechanical property parameters of the tested material may be obtained. In addition, the actual service conditions for the tested material may be simulated according to material testing requirements in different fields.

Figure 18:
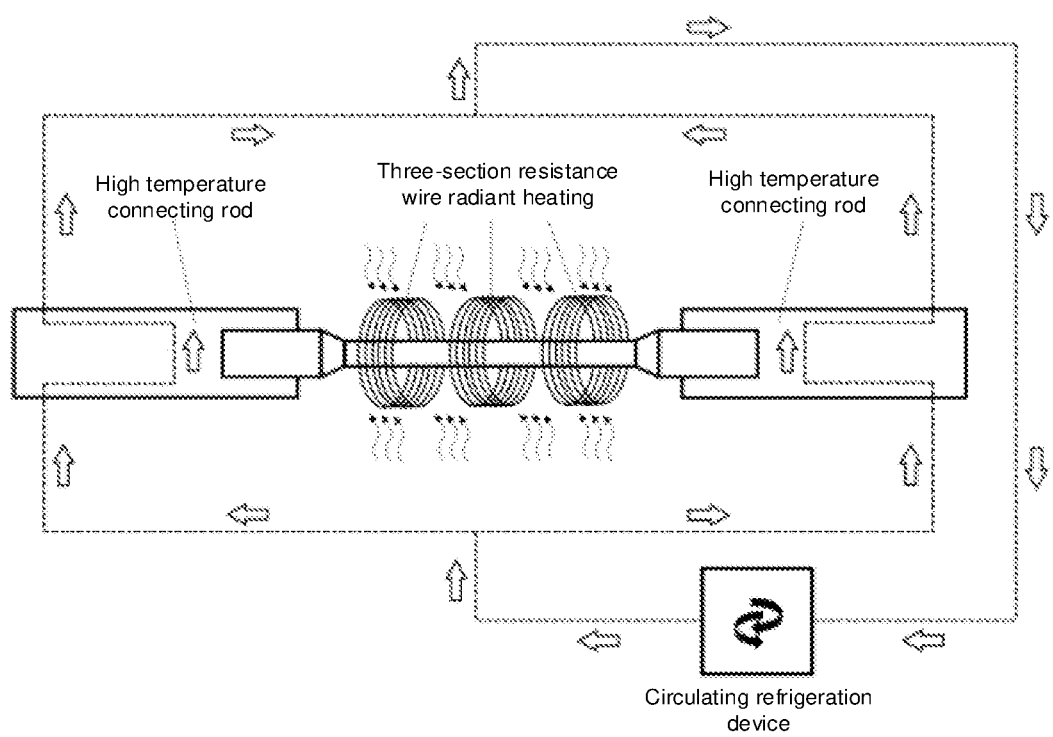
FIG. 18 shows a schematic diagram of a principle of applying a high temperature of the present disclosure.

Referring to FIG. 18, equations related to mechanical load applying of the present disclosure are as follows.

1. Under a tension condition, a stress σ may be calculated by Equation (1):

$$\sigma = \frac{F_1}{A}, \quad \text{Equation (1)}$$

where $F_1$ represents a tensile force, and A represents an area of a cross section of the tested sample;

a stain ε may be calculated by Equation (2):

$$\varepsilon = \frac{\Delta l}{l}, \quad \text{Equation (2)}$$

where $\Delta l$ represents an elongation of the tested sample, and l represents an original length of the tested sample.

2. Under a compression condition, a stress σ may be calculated by Equation (3):

$$\sigma = \frac{F_2}{A}, \quad \text{Equation (3)}$$

where $F_2$ represents a compressive force, and A represents an area of a cross section of the tested sample, a stain ε may be calculated by Equation (4):

$$\varepsilon = \frac{\Delta l}{l}, \quad \text{Equation (4)}$$

where $\Delta l$ represents an elongation of the tested sample, and l represents an original length of the tested sample.

3. Under a bending condition, in an elastic bending range, a maximum bending stress on a side surface of the tested sample under tension may be calculated by Equation (5):

$$\sigma_{max} = \frac{M}{W}, \quad \text{Equation (5)}$$

where M is a maximum bending moment of the tested sample when a three-point bending load is applied to tested sample and may be calculated by Equation (6):

$$M = \frac{F_7 L}{4}, \quad \text{Equation (6)}$$

where $F_7$ represents a bending force, and L represents a span of the tested sample; and W represents a flexural section coefficient of the tested sample, where for a cylindrical tested sample, W may be calculated by Equation (7):

$$W = \frac{\pi D^2}{32}; \quad \text{Equation (7)}$$

for a plate-shaped tested sample, W may be calculated by Equation (8):

$$W = \frac{bh^2}{6}. \quad \text{Equation (8)}$$

4. Under a composite tension/compression-bending load condition, a tension side of a middle interface of the gauge length section of the test sample is a dangerous point, and according to the third strength theory, an equivalent stress $\sigma_{r3}$ of the dangerous point may be calculated by Equation (9):

$$\sigma_{r3} = \sqrt{\sigma^2 + 4\tau^2} = \sqrt{\left(\frac{M_2}{W} + \frac{F_1}{A}\right)^2 + 4\left(\frac{M}{W_P}\right)^2}, \quad \text{Equation (9)}$$

where $M_2$ represents a bending moment, W represents a flexural section coefficient, $F_1$ represents an axial tensile force, A represents an area of a cross section of the gauge length section of the tested sample, M represents a torque, and $W_P$ represents a torsional section coefficient.

5. Under a low cycle fatigue condition, a life of a material under the low cycle fatigue condition may be calculated by Equation (10):

$$\Delta\varepsilon = \Delta\varepsilon_e + \Delta\varepsilon_p = \frac{\sigma'_f}{E}(2N_f)^b + \varepsilon'_f(2N_f)^c, \quad \text{Equation (10)}$$

where $\Delta\varepsilon$ represents a total strain, $\Delta\varepsilon_e$ represents an elastic strain, $\Delta\varepsilon_p$ represents a plastic strain, $\sigma'_f$ represents a fatigue strength coefficient, b represents a fatigue strength index, $\varepsilon'_f$ represents a fatigue plastic coefficient, c represents a fatigue plasticity index, and E represents an elastic modulus of the tested sample.

6. Under an ultrasonic fatigue condition, a fatigue life of the tested sample may be calculated by Equation 11:

$$\sigma_a = \sigma'_f(2N_f)^b \quad \text{Equation (11)},$$

where $\sigma_a$ represents a stress amplitude, $\sigma'_f$ represents a fatigue strength coefficient, and b represents a fatigue strength index.

7. A design formula for a hourglass-shaped ultrasonic tested sample is provided, where (1) a length of an arc transition section of the tested sample may be calculated by Equation 12:

$$L_1 = 2\sqrt{R_0^2 - (R_0 - R_2 + R_1)^2} \quad \text{Equation (12)},$$

where $R_0$ represents an arc radius of the transition section of the tested sample, $R_1$ represents a center radius of the gauge length section of the tested sample, and $R_2$ represents a radius of a characteristic size section of the tested sample;

(2) a resonance length of the tested sample may be calculated by Equation (13) to Equation (16):

$$L_2 = \frac{1}{k}\arctan\left\{\frac{1}{k}\left[\frac{\beta}{\tanh(\beta L_1)} - a\tanh(\alpha L_1)\right]\right\}; \quad \text{Equation (13)}$$

$$k = 2\pi f \sqrt{\rho/E_d}; \quad \text{Equation (14)}$$

$$a = [\text{arch}\,(R_2/R_1)]/L_1; \quad \text{Equation (15)}$$

$$\beta = (\alpha^2 - k^2)^{1/2}, \quad \text{Equation (16)}$$

where $E_d$ represents a dynamic elastic modulus of the tested sample, and ρ represents a density of the tested sample; and (3) a stress-displacement coefficient of the tested sample may be calculated by Equation (17):

$$C_s = E_d A_0 \beta \varphi(L_1, L_2) \qquad \text{Equation (17)},$$

where a unit of $C_s$ is (MPa/μm), and the stress in the tested sample is controlled by controlling a displacement $A_0$ of an end of the tested sample in the ultrasonic fatigue test.

8. A design formula of an ultrasonic bending tested sample is provided, where a resonance length L of the ultrasonic bending tested sample may be calculated by Equation (18):

$$L = 0.506925 \left( \frac{Eh^2}{\rho f^2} \right)^{\frac{1}{4}}; \qquad \text{Equation (18)}$$

a resonance length $L_0$ of the ultrasonic bending tested sample may be calculated by Equation (19):

$$L_0 = 0.27966 \left( \frac{Eh^2}{\rho f^2} \right)^{\frac{1}{4}}; \qquad \text{Equation (19)}$$

a stress displacement coefficient (unit: MPa/μm) of the ultrasonic bending tested sample may be calculated by Equation (20) and Equation (21):

$$M_s = \frac{k^2 E h}{2} \left( \frac{\cosh(kL) - \cos(kL)}{\cosh(kL) + \cos(kL)} \right); \qquad \text{Equation (20)}$$

$$k = \left( \frac{12w^2 \rho}{Eh^2} \right)^{1/4}, \qquad \text{Equation (21)}$$

where h represents a thickness of the tested material sample, E and ρ represent the elastic modulus and the density of the tested material sample, respectively, and f represents a resonant frequency (20 kHz).

The above descriptions are only preferred embodiments of the present disclosure and are not intended to limit the present disclosure. For those skilled in the art, various modifications and changes may be made to the present disclosure. Any modification, equivalent replacement, improvement, etc. made to the present disclosure shall be included within the protection scope of the present disclosure.

What is claimed is:

1. An instrument for mechanical properties in situ testing of materials under a high temperature and complex mechanical loads, comprising:
   a support frame module;
   a high-frequency fatigue load applying module;
   a static-dynamic mechanical load applying module;
   a high/low temperature applying module; and
   an in-situ monitoring module,
   wherein the support frame module is isolated from a vibration through a vibration isolation spring and is fixed to the ground through an anchor screw;
   wherein the high-frequency fatigue load applying module is rigidly connected to a support plate in the support frame module through a motor support base, is matched with a rail assembly I of the support frame module through a slider assembly I, and is rigidly connected to welded bellows I of a high-temperature applying sub-module through a connecting flange, and the high-frequency fatigue load applying module is configured to apply a high-frequency fatigue load on a tested sample or apply a static bending preload on the tested sample;
   wherein the static-dynamic mechanical load applying module is rigidly connected to a mounting platform of the support frame module through a hydraulic cylinder fixing plate and an intermediate connecting plate, and is connected to welded bellows II, welded bellows IV, and welded bellows III of the high-temperature applying sub-module through a flange of a high-temperature connecting rod I, a flange of a high-temperature connecting rod II, and a flange of a high-temperature connecting rod III respectively, and the static-dynamic mechanical load applying module is configured to apply a combination of static-dynamic tension/compression/bending loads on the tested sample;
   wherein the high-temperature applying sub-module of the high/low temperature applying module is rigidly connected to the mounting platform through an L-shaped rail base, a low-temperature applying sub-module of the high/low temperature applying module is matched with a rail assembly III of a rotary cart through a slider assembly III, and the high-temperature applying sub-module and the low-temperature applying sub-module are switchable for use, so as to apply a variable temperature environment from a low temperature to a high temperature on the tested sample;
   wherein the in-situ monitoring module is arranged in front of the high-temperature applying sub-module and behind the high-temperature applying sub-module, and is integrally fixed on the mounting platform, and the in-situ monitoring module is configured to dynamically monitor microstructure evolution of the tested sample and a fatigue failure mode of the tested sample in situ; and
   wherein the high-frequency fatigue load applying module is arranged vertically, the static-dynamic tension/compression load applying sub-module is arranged horizontally, and the high-frequency fatigue load applying module and the static-dynamic tension/compression load applying sub-module are perpendicular to each other in space; the high-frequency fatigue load applying module is individually operable, to apply a static bending preload and a high-frequency fatigue load on the tested sample during a test; and the high-frequency fatigue load applying module is operable in cooperation with the static-dynamic tension/compression load applying sub-module to apply a high-frequency fatigue load on the tested sample loaded with a static-dynamic bending load applied.

2. The instrument for mechanical properties in situ testing of materials under a high temperature and complex mechanical loads according to claim 1, wherein the support frame module has a four-pillar structure as a whole to firmly support the high-frequency fatigue load applying module, the static-dynamic mechanical load applying module, the high/low temperature applying module, and the in-situ monitoring module; and
   wherein the support frame module has such a structure that an upper surface of a mounting table is machined with mutually perpendicular T-shaped grooves, a lower surface of the mounting table is machined with mutually perpendicular reinforcing ribs, and a middle of the mounting table is machined with a groove for mounting and positioning a static-dynamic bending load applying sub-module.

3. The instrument for mechanical properties in situ testing of materials under a high temperature and complex mechanical loads according to claim 1, wherein the high-frequency fatigue load applying module is vertically arranged above the instrument and is rigidly connected to the support plate of the support frame module through the motor support base, so as to mount and position the high-frequency fatigue load applying module;

wherein the high-frequency fatigue load applying module is matched with the rail assembly I of the support frame module through the slider assembly I, so as to precisely guide the high-frequency fatigue load applying module in a load applying direction and eliminate a lateral force influence generated during a test process;

wherein the high-frequency fatigue load applying module is rigidly connected to the welding bellows I of the high-temperature applying sub-module through the connecting flange, so that the high-frequency fatigue load applying module is sealed with the high-temperature applying sub-module; the high-frequency fatigue load applying module is driven by a servo motor, and a power is finally delivered to an ultrasonic bending indenter after the power is transmitted by a reducer, a coupling and a lead screw, so as to preload a static bending load on the tested sample; and wherein the high-frequency fatigue load applying module is driven by an ultrasonic transducer, and an amplitude is finally transmitted to the ultrasonic bending indenter after being amplified step by step through an ultrasonic connector I, an ultrasonic connector II, and an ultrasonic probe, so as to apply the high-frequency fatigue load on the tested sample.

4. The instrument for mechanical properties in situ testing of materials under a high temperature and complex mechanical loads according to claim 1, wherein the static-dynamic mechanical load applying module is arranged on the mounting platform, and the static-dynamic mechanical load applying module comprises:
   a high-temperature connecting rod assembly;
   a static-dynamic tension/compression load applying sub-module; and
   a static-dynamic bending load applying sub-module,
   wherein the high-temperature connecting rod assembly enables a normal use of the static-dynamic mechanical load applying module in a high-temperature environment;
   wherein the static-dynamic tension/compression load applying sub-module is arranged horizontally, a hydraulic cylinder assembly I and a hydraulic cylinder assembly II have a same structure and are symmetrically arranged with respect to the tested sample; the hydraulic cylinder assembly I and the hydraulic cylinder assembly II are individually operable to apply a static-dynamic tension/compression load on a single end of the tested sample during a test, and are synchronously operable to apply static-dynamic tension/compression loads synchronously on both ends of the tested sample, so as to prevent a center of a gauge length section of the tested sample from shifting during a process of applying the loads; and
   wherein the static-dynamic bending load applying sub-module is vertically arranged below the instrument and is rigidly connected to a lower surface of the mounting platform through the intermediate connecting plate,
   wherein the static-dynamic bending load applying sub-module is individually operable to apply a static-dynamic bending load on the tested sample, or operable in cooperation with the hydraulic cylinder assembly I and the hydraulic cylinder assembly II of the static-dynamic tension/compression load applying sub-module to apply composite static-dynamic tension/compression loading loads synchronously on the both ends of the tested sample, so as to prevent the center of the gauge length section of the tested sample from shifting during a process of applying the composite loads.

5. The instrument for mechanical properties in situ testing of materials under a high temperature and complex mechanical loads according to claim 1, wherein the high/low temperature applying module comprises:
   the high-temperature applying sub-module;
   the low-temperature applying sub-module; and
   the rotary cart,
   wherein the high-temperature applying sub-module is rigidly connected to the mounting platform of the support frame module through the L-shaped rail base, and the low-temperature applying sub-module is matched with the rail assembly III of the rotary cart through the slider assembly III; the rotary cart is movable through four rollers, and a height of the rail assembly III and a level of the rail assembly II are adjustable through four adjustment screws; the high-temperature applying sub-module and the low-temperature applying sub-module are switchable for use through the rotary cart.

6. The instrument for mechanical properties in situ testing of materials under a high temperature and complex mechanical loads according to claim 1, wherein the in-situ monitoring module comprises:
   a three-degree-of-freedom motion platform;
   a surface deformation damage measurement assembly;
   a microstructure measurement assembly;
   an internal damage detection assembly; and
   a three-dimensional strain measurement assembly,
   wherein the internal damage detection assembly and the three-dimensional strain measurement assembly are arranged in front of the high-temperature applying sub-module to dynamically monitor global temperature information, internal damage information, and three-dimensional strain information of the gauge length section of the tested sample, respectively;
   wherein the surface deformation damage measurement assembly and the microstructure measurement assembly are arranged on the three-degree-of-freedom motion platform behind the high-temperature applying sub-module, and the three-degree-of-freedom motion platform is rigidly connected to the mounting platform through a screw, wherein through the three-degree-of-freedom motion platform, the surface deformation damage measurement assembly and the microstructure measurement assembly are switchable for use, and relative positions of the surface deformation damage measurement assembly and the microstructure measurement assembly are precisely adjusted along an axial direction of the tested sample and a radial direction of the tested sample, so as to monitor global surface deformation damage information of the gauge length section of the tested sample in real time, and performing a follow-up monitoring on a micro-area morphology of the gauge length section of the tested sample; and wherein four in-situ monitoring measures comprising the surface deformation damage measurement assembly, the microstructure measurement assembly, the internal damage detection assembly, and the three-dimensional strain measurement assembly are individually operable, operable in a pairwise combination, or operable in a combination of at most three at a same time, so as to dynamically monitor the microstructure evolution of the tested sample and the fatigue failure mode of the tested sample in situ.

7. The instrument for mechanical properties in situ testing of materials under a high temperature and complex mechanical loads according to claim 1, wherein the hydraulic cylinder fixing plate is rigidly connected to the mounting platform through a T-bolt, and is rigidly connected to four pull rods through an expansion sleeve assembly to form a reinforced force closed-loop structure, so as to greatly increase a rigidity of the static-dynamic tension/compression load applying sub-module; and the hydraulic cylinder assembly I and the hydraulic cylinder assembly II are movable toward each other along the pull rods to precisely adjust relative positions of the hydraulic cylinder assembly I and the hydraulic cylinder assembly II.

8. The instrument for mechanical properties in situ testing of materials under a high temperature and complex mechanical loads according to claim 1, wherein an upper side, a lower side, a left side, and a right side of a chamber of a vacuum chamber I of the high-temperature applying sub-module are respectively mounted with the welded bellows I, the welded bellows III, the welded bellows II, and the welded bellows IV, and are respectively connected to the connecting flange, the flange on the high-temperature connecting rod I, the flange on the high-temperature connecting rod II, and the flange of the high-temperature connecting rod III, so that the vacuum chamber I moves in a sealed state during a test; a front side and a rear side of the chamber of the vacuum chamber I are respectively provided with a quartz observation window I and a quartz observation window II, so that the in-situ monitoring module dynamically monitors the tested sample in situ smoothly.

9. A method using the instrument for mechanical properties in situ testing of materials under a high temperature and complex mechanical loads according to claim 1, comprising:
step 1 of installing a tested sample, wherein a thread of a clamped end of the tested sample is matched with an internal thread of a connector I and an internal thread of a connector II, the connector I and the connector II are respectively mounted in a mounting hole at an end of the high-temperature connecting rod I and a mounting hole at an end of the high-temperature connecting rod II, and a high-temperature connector I and a high-temperature connector II are tightened, so as to install the tested sample;
step 2 of applying, by a high temperature applying sub-module, a high-temperature environment load on the tested sample, wherein a vacuum chamber I is evacuated by a mechanical pump, or an inert gas is continuously introduced into the vacuum chamber I to form an inert gas atmosphere; a temperature controller applies voltages of different values to three sections of resistance wire in a heating furnace to heat the heating furnace, and a high-temperature environment of different temperatures is applied on the tested sample by means of thermal radiation; an infrared colorimeter I and an infrared colorimeter II monitor a temperature of a gauge length section of the tested sample in real time, and an average value of the temperature is determined and fed back to the temperature controller, so as to form a closed-loop control;
step 3 of applying, by a static-dynamic tension/compression load applying sub-module, static tension/compression loads synchronously on both ends of the tested sample, wherein a motion controller controls a high-pressure hydraulic oil to drive a piston rod I of a hydraulic cylinder assembly I and a piston rod I of a hydraulic cylinder assembly II to synchronously move toward each other, then hydraulic forced clamps are driven to move synchronously toward each other through a transmission by an intermediate connecting assembly, and finally both ends of the high-temperature connecting rod assembly are driven to move synchronously toward each other, so as to apply the static tension/compression loads synchronously on both ends of the tested sample;
step 4 of applying, by a high-frequency fatigue load applying module, a static bending load on the tested sample, wherein a power output by a servo motor is finally transmitted to an ultrasonic bending indenter after being multi-stage decelerated by a reducer, converted by a lead screw and a lead screw nut, and transmitted by a connecting sleeve, a connecting plate, a tension/compression sensor I, a mounting plate, a dowel rod, an upper clamping plate, a lower clamping plate, an ultrasonic connector I, an ultrasonic connector II, and an ultrasonic probe, so as to apply a static bending preload on the tested sample;
step 5 of applying, by a high-frequency fatigue load applying module, an ultrasonic fatigue load on the tested sample, wherein a weak amplitude output by an ultrasonic transducer is finally transmitted to the ultrasonic bending indenter after being amplified step by step by an ultrasonic connector I, an ultrasonic connector II, and an ultrasonic probe, to apply a high-frequency fatigue load on the tested sample; and
step 6 of dynamically monitoring, by an in-situ monitoring module, the tested sample in situ, wherein an internal damage detection assembly and a three-dimensional strain measurement assembly dynamically monitor global temperature information, internal damage information, and three-dimensional strain information of the gauge length section of the tested sample; the surface deformation damage measurement assembly and the microstructure measurement assembly are switchable for use through the three-degree-of-freedom motion platform, and relative positions of the surface deformation damage measurement assembly and the microstructure measurement assembly along an axial direction of the tested sample and a radial direction of the tested sample are precisely adjusted through the three-degree-of-freedom motion platform, so as to monitor global surface deformation damage information of the gauge length section of the tested sample in real time, and performing a follow-up monitoring of a micro-area morphology of the gauge length section of the tested sample dynamically, wherein four in-situ monitoring measures comprising the surface deformation damage measurement assembly, the microstructure measurement assembly, the internal damage detection assembly, and the three-dimensional strain measurement assembly are individually operable, operable in a pairwise combination, or operable in a combination of at most three at a same time, so as to dynamically monitor microstructure evolution of the tested sample and a fatigue failure mode of the tested sample in situ.

\* \* \* \* \*